US009250707B2

(12) United States Patent
Choi et al.

(10) Patent No.: US 9,250,707 B2
(45) Date of Patent: Feb. 2, 2016

(54) IMAGE DISPLAY APPARATUS AND METHOD FOR OPERATING THE SAME

(71) Applicant: LG ELECTRONICS INC., Seoul (KR)

(72) Inventors: Eunjung Choi, Seoul (KR); Kwangsoo Choi, Seoul (KR); Sunghee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 13/828,921

(22) Filed: Mar. 14, 2013

(65) Prior Publication Data

US 2014/0089849 A1    Mar. 27, 2014

(30) Foreign Application Priority Data

Sep. 24, 2012  (KR) .......................... 10-2012-0106033

(51) Int. Cl.

| | |
|---|---|
| *G06F 3/048* | (2013.01) |
| *G06F 3/01* | (2006.01) |
| *G06F 3/0482* | (2013.01) |
| *G06Q 30/02* | (2012.01) |
| *G06Q 10/06* | (2012.01) |

(52) U.S. Cl.
CPC .............. *G06F 3/017* (2013.01); *G06F 3/0482* (2013.01); *G06Q 10/06398* (2013.01); *G06Q 30/02* (2013.01)

(58) Field of Classification Search
CPC ........ G06F 3/017; G06F 3/0304; G06F 3/011
See application file for complete search history.

(56) References Cited

U.S. PATENT DOCUMENTS

| | | | |
|---|---|---|---|
| 6,865,719 B1* | 3/2005 | Nicholas, III .......... | G06Q 30/02 715/854 |
| 2001/0012001 A1 | 8/2001 | Rekimoto et al. | |
| 2004/0135824 A1* | 7/2004 | Fitzmaurice ............ | G06F 3/048 715/856 |
| 2006/0209021 A1* | 9/2006 | Yoo et al. ....................... | 345/156 |
| 2007/0298882 A1* | 12/2007 | Marks et al. .................... | 463/36 |
| 2008/0141181 A1 | 6/2008 | Ishigaki et al. | |
| 2008/0222569 A1* | 9/2008 | Champion ............ | G06F 3/0482 715/834 |
| 2009/0027337 A1 | 1/2009 | Hildreth | |
| 2009/0079813 A1* | 3/2009 | Hildreth ..................... | 348/14.03 |
| 2009/0225026 A1 | 9/2009 | Sheba | |
| 2009/0262187 A1 | 10/2009 | Asada et al. | |
| 2010/0269072 A1 | 10/2010 | Sakata et al. | |
| 2010/0306699 A1* | 12/2010 | Hsu et al. ...................... | 715/810 |
| 2011/0280441 A1 | 11/2011 | Chen et al. | |

(Continued)

FOREIGN PATENT DOCUMENTS

| | | |
|---|---|---|
| WO | WO 2011/106008 A1 | 9/2011 |
| WO | WO 2012/093394 A2 | 7/2012 |

OTHER PUBLICATIONS

Chen et al., A Generic Framework for the Design of Visual-based Gesture Control Interface; © 2010; IEEE; pp. 1522-1525.*

(Continued)

*Primary Examiner* — Linh K Pham
(74) *Attorney, Agent, or Firm* — Birch, Stewart, Kolasch & Birch, LLP

(57) ABSTRACT

An image display apparatus and a method for operating the same are discussed. According to an embodiment, the method includes recognizing, by the image display apparatus, a specific gesture made with a user's hand as a first gesture; and displaying, on a screen of the display, a menu at a position of the screen corresponding to the position of the user's hand according to the recognized first gesture.

19 Claims, 39 Drawing Sheets

(56) References Cited

U.S. PATENT DOCUMENTS

| | | | |
|---|---|---|---|
| 2012/0113223 | A1 | 5/2012 | Hilliges et al. |
| 2012/0162409 | A1 | 6/2012 | Setiawan et al. |
| 2012/0236180 | A1 | 9/2012 | Lin |
| 2012/0320080 | A1* | 12/2012 | Giese et al. .................... 345/619 |
| 2013/0067377 | A1* | 3/2013 | Rogers ................ G06F 3/04817 <br> 715/769 |
| 2013/0067392 | A1* | 3/2013 | Leonard et al. ............... 715/784 |
| 2013/0265226 | A1* | 10/2013 | Park et al. ..................... 345/156 |
| 2013/0278493 | A1* | 10/2013 | Wei et al. ...................... 345/156 |
| 2013/0283213 | A1* | 10/2013 | Guendelman ........... G06F 3/017 <br> 715/848 |

OTHER PUBLICATIONS

Schlegel et al., AirTouch: InteractingWith Computer Systems At a Distance; © 2010; IEEE; pp. 1-8.*

Gadea et al., Finger-Based Gesture Control of a Collaborative Online Workspace; © 2012; IEEE; pp. 41-46.*

Visser et al.; Near and Far Distance Gesture Tracking for 3D Applications. © 2011; IEEE; 4 pages.*

* cited by examiner

IMAGE DISPLAY APPARATUS AND METHOD FOR OPERATING THE SAME

CROSS-REFERENCE TO RELATED APPLICATION

This application claims the benefit of Korean Patent Application No. 10-2012-0106033, filed on Sep. 24, 2012 in the Korean Intellectual Property Office, the disclosure of which is incorporated herein by reference.

BACKGROUND OF THE INVENTION

1. Field of the Invention

The present invention relates to an image display apparatus and a method for operating the same, and more particularly, to an image display apparatus and a method for operating the same, which can increase user convenience.

2. Description of the Related Art

An electronic device processes an electrical signal and operates based on the processed electrical signal, according to a user's manipulation. Among electronic devices, an image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

SUMMARY OF THE INVENTION

Therefore, the present invention has been made in view of the above problems and other limitations associated with the related art, and it is an object of the present invention to provide an image display apparatus and a method for operating the same, which can increase user convenience.

It is another object of the present invention to provide an image display apparatus and a method for operating the same, which can display a menu according to a user gesture.

In accordance with an aspect of the present invention, the above and other objects can be accomplished by the provision of a method for operating an image display apparatus, including recognizing a first gesture made with a user's hand, displaying a menu at a position corresponding to the position of the user's hand according to the recognized first gesture, and terminating displaying the menu, if the user's hand is not recognized or a second gesture made by the user's hand is recognized.

In accordance with another aspect of the present invention, there is provided a method for operating an image display apparatus, including recognizing a user's face, recognizing a first gesture made with the user's hand, and displaying a menu at a position corresponding to a position of the user's hand according to the recognized user's face and the recognized first gesture.

In accordance with another aspect of the present invention, there is provided an image display apparatus including a display, a camera to capture an image, and a controller to recognize a first gesture made with a user's hand from the captured image and to control display of a menu at a position corresponding to the position of the user's hand according to the recognized first gesture. The controller controls termination of displaying the menu, if the user's hand is not recognized or a second gesture made by the user's hand is recognized.

In accordance with another aspect of the present invention, there is provided a method for operating an image display apparatus including a display, comprising: recognizing, by the image display apparatus, a specific gesture made with a user's hand as a first gesture; and displaying, on a screen of the display, a menu at a position of the screen corresponding to the position of the user's hand according to the recognized first gesture.

In accordance with another aspect of the present invention, there is provided an image display apparatus comprising: a display including a screen; and a controller configured to: recognize a specific gesture made with a user's hand as a first gesture, and display, on the screen of the display, a menu at a position of the screen corresponding to the position of the user's hand according to the recognized first gesture.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
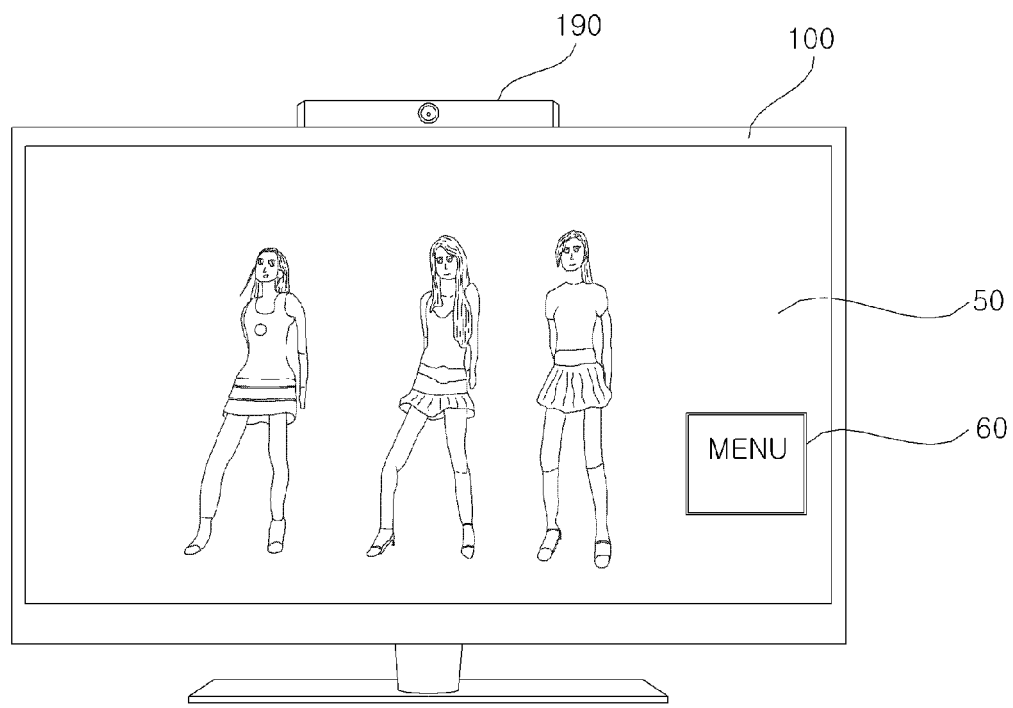
FIG. 1 illustrates an image display apparatus and the exterior of the image display apparatus according to an embodiment of the present invention.
Figure 1:
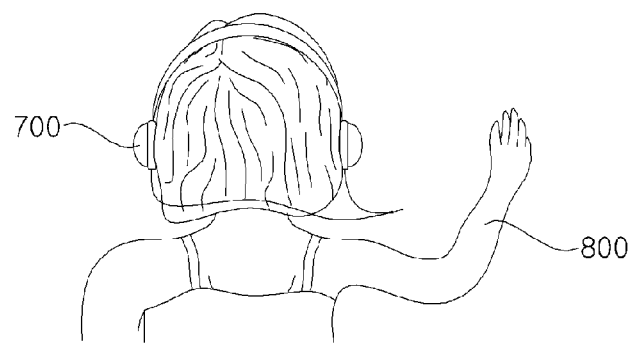

FIG. 1 illustrates an image display apparatus and the exterior of the image display apparatus according to an embodiment of the present invention.

Referring to FIG. 1, an image display apparatus 100 according to an embodiment of the present invention is capable of recognizing various user gestures. To recognize a user gesture, the image display apparatus 100 may include a camera 190 or another gesture/image capturing unit. In another example, the image display apparatus may also include multiple cameras 190.

While the camera 190 is shown in FIG. 1 as disposed on top of the image display apparatus 100, the camera 190 may be positioned in various manners. The camera 190 may capture an image of a user and transmit the captured image to a controller 170 (FIG. 2) in the image display apparatus 100.

Unlike the configuration of the image display apparatus 100 illustrated in FIG. 1, the camera 190 may be configured separately from the image display apparatus 100. The camera 190 may also communicate wirelessly with the controller 170.

In accordance with an embodiment of the present invention, the image display apparatus 100 recognizes a first gesture made with the user's hand and displays a menu on a display 180 (FIG. 2) at a position corresponding to the position of the user's hand according to the recognized first gesture.

For example, when the user makes a gesture of raising the right hand, the image display apparatus 100 may recognize the gesture as valid, that is, as a first gesture from an image captured by the camera 190 in FIG. 1. Then the image display apparatus 100 displays a specific menu at a position corresponding to the user's hand on the display 180. Since the menu can be displayed in a user-intended area in this manner, user convenience can be increased.

Displaying a menu in correspondence with a user gesture according to the present invention will be described later in greater detail with reference to FIGS. 4 to 16C.

The image display apparatus 100 may process a received broadcast signal, external input signal, or streaming signal and thus may display a processed video signal on the display 180, while outputting a processed audio signal.

The image display apparatus 100 may be or include a TV, a monitor, a computer, a laptop computer, a tablet PC, a mobile terminal, a smart device, etc. as far as they can display a broadcast signal. The following description is made with the appreciation that the image display apparatus 100 is a TV, by way of example only but the present invention is not limited thereto.

Figure 2:
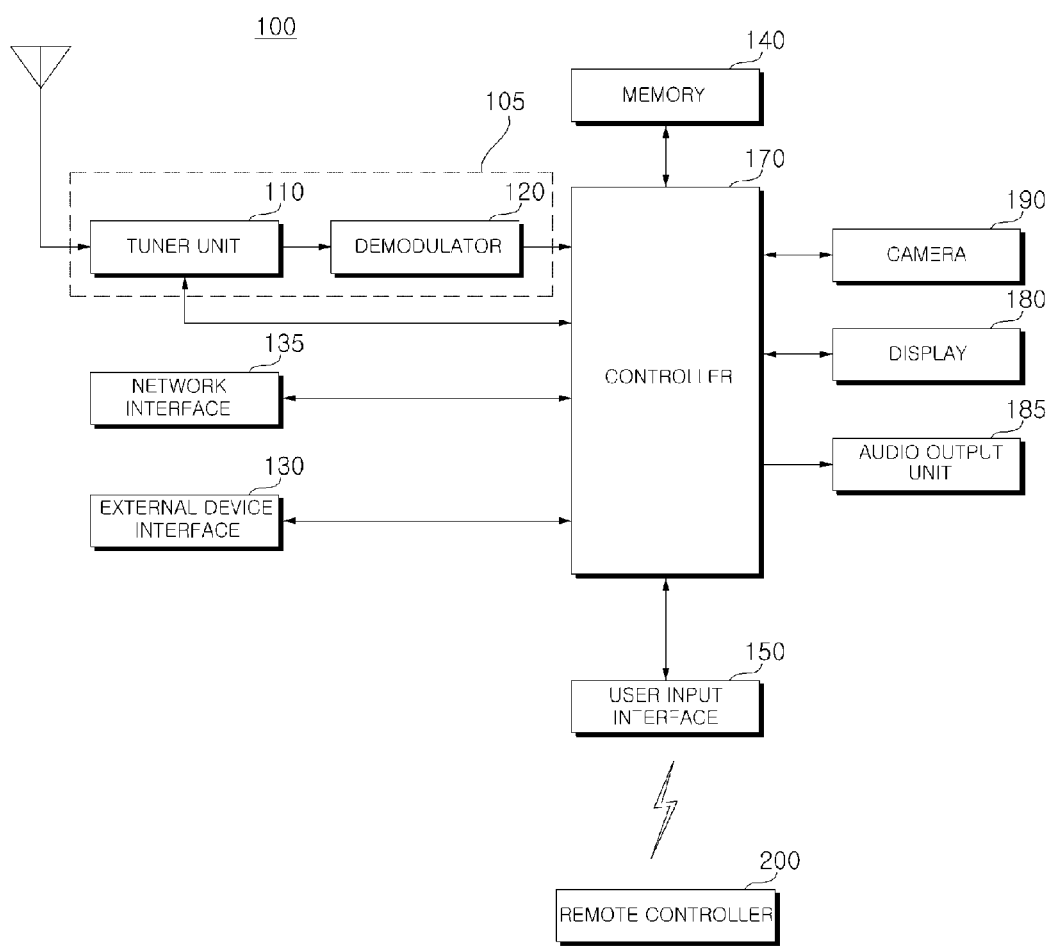
FIG. 2 is a block diagram of the image display apparatus illustrated in FIG. 1 according to an embodiment of the present invention.

FIG. 2 is a block diagram of the image display apparatus according to an embodiment of the present invention. Referring to FIG. 2, the image display apparatus 100 according to an embodiment of the present invention includes a broadcasting receiver 105, an external device interface 130, a memory 140, a user input interface 150, a sensor unit (not shown), the controller 170, the display 180, the camera 190, an audio output unit 185, and a remote controller 200. All components of the image display apparatus 100 are operatively coupled and configured.

The broadcasting receiver 105 may include a tuner unit 110, a demodulator 120, and a network interface 135. As needed, the broadcasting receiver 105 may be configured so as to include only the tuner unit 110 and the demodulator 120 or only the network interface 135.

The tuner unit 110 selects a Radio Frequency (RF) broadcast signal corresponding to a channel selected by a user or an RF broadcast signal corresponding to each of pre-stored channels from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner unit 110 downconverts the selected RF broadcast signal into a digital IF signal, DIF. On the other hand, if the selected RF broadcast signal is an analog broadcast signal, the tuner unit 110 downconverts the selected RF broadcast signal into an analog baseband A/V signal, CVBS/SIF. That is, the tuner unit 110 may be a hybrid tuner capable of processing not only digital broadcast signals but also analog broadcast signals. The analog baseband A/V signal CVBS/SIF may be directly input to the controller 170.

The tuner unit 110 may be capable of receiving RF broadcast signals from an Advanced Television Systems Committee (ATSC) single-carrier system or from a Digital Video Broadcasting (DVB) multi-carrier system.

The tuner unit 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The tuner unit 110 may include a plurality of tuners for receiving broadcast signals on a plurality of channels. Alternatively, the tuner unit 110 may be implemented into a single tuner for simultaneously or sequentially receiving broadcast signals on a plurality of channels.

The demodulator 120 receives the digital IF signal DIF from the tuner unit 110 and demodulates the digital IF signal DIF. The demodulator 120 may perform demodulation and channel decoding on the digital IF signal DIF, thereby obtaining a stream signal TS. The stream signal TS may be a signal in which a video signal, an audio signal and a data signal are multiplexed.

The stream signal TS may be input to the controller 170 and thus subjected to demultiplexing and A/V signal processing. The processed video and audio signals are output to the display 180 and the audio output unit 185, respectively.

The external device interface 130 may transmit data to or receive data from an external device connected to or communicating with the image display apparatus 100. For data transmission and reception, the external device interface 130 may include an A/V Input/Output (I/O) unit and/or a wireless communication module.

The external device interface 130 may be connected to one or more external devices such as a Digital Versatile Disk (DVD) player, a Blu-ray player, a game console, a camera, a camcorder, a computer (e.g., a laptop computer), a mobile terminal, a smart phone, a smart appliance, or a set-top box, wirelessly or by wire. Then, the external device interface 130 transmits and receives signals to and from the external device.

The A/V I/O unit of the external device interface 130 may receive video, audio, and/or data signals from the external device. The wireless communication module of the external device interface 130 may perform short-range wireless communication with other electronic devices.

The network interface 135 serves as an interface between the image display apparatus 100 and a wired/wireless network such as the Internet, home network, extranet, intranet, etc. For interfacing, the network interface 135 may include a wired communication unit and/or a wireless communication unit.

For example, the network interface 135 may receive content or data from the Internet or from a server provided by a Content Provider (CP) or a Network Provider (NP) over a network. The network interface 135 can conduct data communication with a network router and exchange data in a network under the network router.

The memory 140 may store various programs used for the controller 170 to process and control signals, and may also store one or more processed video, audio and data signals. The memory 140 may temporarily store a video, audio and/or data signal received from the external device interface 130. The memory 140 may store information about broadcast channels by the channel-add function such as a channel map.

While the memory 140 is shown in FIG. 2 as configured separately from the controller 170, to which the present invention is not limited, the memory 140 may be incorporated into the controller 170, for example.

The user input interface 150 transmits a signal received from the user to the controller 170 and/or transmits a signal received from the controller 170 to the user.

For example, the user input interface 150 may receive various user input signals such as a power-on/off signal, a channel selection signal, and a screen setting signal from the remote controller 200, provide the controller 170 with user input signals received from local keys, such as inputs of a power key, a channel key, and a volume key, and a setting key, transmit a control signal received from the sensor unit for sensing a user gesture to the controller 170, and transmit a signal received from the controller 170 to the sensor unit.

The controller 170 may demultiplex the stream signal TS received from the tuner unit 110, the demodulator 120, or the external device interface 130 into a number of signals and process the demultiplexed signals into audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185 such as a speaker. Also, the audio signal processed by the controller 170 may be transmitted to the external output device through the external device interface 130.

While not shown in FIG. 2, the controller 170 may include a demultiplexer (DEMUX) and a video processor, which will be described later with reference to FIG. 3.

In addition, the controller 170 may provide overall control to the image display apparatus 100. For example, the controller 170 may control the tuner unit 110 to tune to an RF broadcast signal corresponding to a user-selected channel or a pre-stored channel. The controller 170 may control the image display apparatus 100 according to a user command received through the user input interface 150 or according to an internal program.

The controller 170 may also control the display 180 to display images. The image displayed on the display 180 may be a two-Dimensional (2D) or three-Dimensional (3D) still image or moving picture.

The controller 170 may recognize a user's gesture from an image captured by the camera 190. Particularly, the controller 170 recognizes the user's face and hand from the captured image using known techniques. In the case where the user's face and hand are positioned at a height lower than a predetermined value, if the user raises the hand from that height, the controller 170 may determine the raising of the hand to be an upward gesture and as being valid. Then the controller 170 may control displaying of a specific menu in an area (of the display 180) corresponding to the raised position of the user's hand according to the gesture.

The image display apparatus 100 may further include a channel browsing processor for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded together with a decoded image. The controller 170 may display a thumbnail list including a plurality of received thumbnail images on the display 180.

The thumbnail list may be displayed on a part of the display 180 with an image displayed on the display 180, e.g., as a compact view, or the thumbnail list may be displayed in full screen on the display 180. The thumbnail images of the thumbnail list may be updated sequentially.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 may also be capable of displaying 3D images.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special glasses on the part of a user. Thus, the display 180 displays 3D images on its own. Renticular and parallax barrier are examples of auto-stereoscopic 3D imaging.

The traditional stereoscopy requires an additional display besides the display 180 in order to display 3D images. The additional display may be a Head Mount Display (HMD) type, a glasses type, etc.

As special 3D glasses, polarized glasses operate in a passive manner, whereas shutter glasses operate in an active manner. Also, HMD types may be categorized into passive ones and active ones.

A viewing device may be 3D glasses that enable the user to wear and view 3D images, e.g., 3D images displayed on the display 180. The 3D glasses may be passive-type polarized glasses, active-type shutter glasses, or an HMD type.

The viewing device may be glasses with which different users can view different images. For example, a first viewing device worn by a first user may be glasses that allow only a first image to be viewed and a second viewing device worn by a second user may be glasses that allow only a second image to be viewed. As such, using the viewing devices, different users can view the same or different images at the same time on the display 180.

The display 180 may also be a touch screen that can be used not only as an output device but also as an input device.

The audio output unit 185 may receive a processed audio signal from the controller 170 and output the received audio signal as voice or other sounds.

The camera 190 captures an image of the user positioned in front of or near the camera 190. A single camera 190 may be used, to which the present invention is not limited. Thus, a plurality of cameras 190 may also be used. The camera 190 may be embedded above the display 180 in the image display apparatus 100, or may be separately configured. Image information of the user captured by the camera 190 may be provided to the controller 170.

The controller 170 may sense the user's gesture from the captured image information received from the camera 190 or from signals received from the sensor unit of the apparatus 100 alone or in combination.

The remote controller 200 transmits a user input to the user input interface 150. For the transmission of the user input, the remote controller 200 may operate in conformance to various communication standards such as Bluetooth, RF, InfraRed (IR), Ultra WideBand (UWB), ZigBee, etc. In addition, the remote controller 200 may receive a video signal, audio signal and/or data signal from the user input interface 150 and output the received signal as an image or sound.

The above-described image display apparatus 100 may be a fixed or mobile digital broadcast receiver.

The block diagram of the image display apparatus 100 illustrated in FIG. 2 is an exemplary embodiment of the present invention. The image display apparatus 100 is shown in FIG. 2 as having a number of components in a given configuration. However, the image display apparatus 100 may include fewer components or more components than those shown in FIG. 2 in alternative embodiments. Also, two or more components of the image display apparatus 100 may be combined into a single component or a single component thereof may be separated into two or more components in alternative embodiments. The functions of the components of the image display apparatus 100 as set forth herein are illustrative in nature and may be modified, for example, to meet the requirements of a given application.

Unlike the configuration illustrated in FIG. 2, the image display apparatus 100 may be configured so as to receive and playback video content through the network interface 135 or the external device interface 130, without the tuner unit 110 and the demodulator 120.

Figure 3:
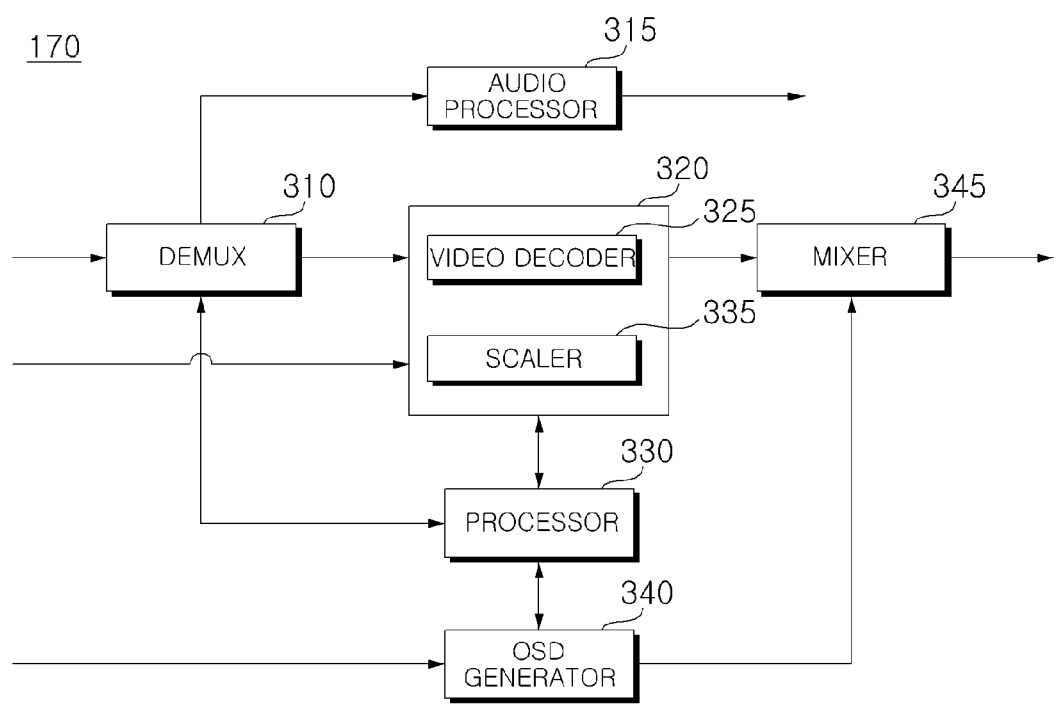
FIG. 3 is a block diagram of a controller illustrated in FIG. 2 according to an embodiment of the present invention.

FIG. 3 is a block diagram of the controller 170 illustrated in FIG. 2 according to an embodiment of the present invention.

Referring to FIG. 3, the controller 170 may include a DEMUX 310, an audio processor 315, a video processor 320, a processor 330, an On Screen Data (OSD) generator 340, and a mixer 345 according to an embodiment of the present invention. Besides, the controller 170 may further include a data processor and other known components.

The DEMUX 310 demultiplexes an input stream. For example, the DEMUX 310 may demultiplex an MPEG-2 TS into a video signal, an audio signal, and a data signal. The input stream signal may be received from the tuner unit 110, the demodulator 120 or the external device interface 130.

The audio processor 315 may process the demultiplexed audio signal. For the audio signal processing, the audio processor 315 may have a plurality of decoders. To efficiently transmit audio data to an external device, the audio processor 315 may include an encoder. The audio processor 315 may adjust the bass, treble, and volume of the audio signal.

The video processor 320 may process the demultiplexed video signal. For video signal processing, the video processor 320 may include a video decoder 325 and a scaler 335. The video decoder 325 decodes the demultiplexed video signal and the scaler 335 scales the resolution of the decoded video signal so that the video signal can be displayed on the display 180.

The processor 330 may provide overall control to the image display apparatus 100 or the controller 170. For example, the processor 330 may control the tuner unit 110 to tune to RF broadcasting corresponding to a user-selected channel or a pre-stored channel. The processor 330 may also control the image display apparatus 100 according to a user command received through the user input interface 150 or an internal program. The processor 330 may control data transmission through the network interface 135 or the external device interface 130. The processor 330 may control operations of the DEMUX 310, the video processor 320, and the OSD generator 340 in the controller 170.

In accordance with an embodiment of the present invention, the processor 330 may recognize the user's gesture from an image captured by the camera 190. Particularly, the processor 330 recognizes the user's face and hand from the captured image using known face recognition and image recognition techniques. In the case where the user's face and hand are positioned at a height lower than a predetermined value, if the user raises the hand from the height, the controller 170 may determine the raising of the hand as an upward gesture and as being valid. Then the processor 330 may control displaying of a specific menu in an area (of the display 180) corresponding to the raised position of the user's hand according to the gesture.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

Further, the OSD generator 340 may generate a pointer to be displayed on the display 180 based on a pointing signal received from the remote controller 200. Especially, the pointer may be generated from a pointing signal processor, which may reside in the OSD generator 240. Obviously, the pointing signal processor may be configured separately from the OSD generator 340.

Meanwhile, the OSD generator 340 may generate a menu corresponding to a gesture recognized by the processor 330. The OSD generator 340 may generate different menus for different gestures, users, or the user's right and left hands.

The mixer 345 may mix the decoded video signal processed by the video processor 320 with the OSD signal generated from the OSD generator 340.

The mixer 345 may mix a decoded video signal received from the video processor 320 with a menu generated in correspondence with the user's gesture by the OSD generator 340. The menu may be displayed at a variable position according to the position of the user's hand. That is, the display position of the menu can be determined by the position of the user's hand, and may be changed correspondingly by a changed position of the user's hand.

The data processor of the controller 170 may process the data signal obtained by demultiplexing the input stream signal. For example, if the demultiplexed data signal is a coded data signal, the data processor may decode the coded data signal. The coded data signal may be an EPG (electronic program guide) which includes broadcast information specifying the start time, end time, etc. of scheduled broadcast TV or radio programs.

The block diagram of the image display apparatus 100 illustrated in FIG. 3 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Figure 4:
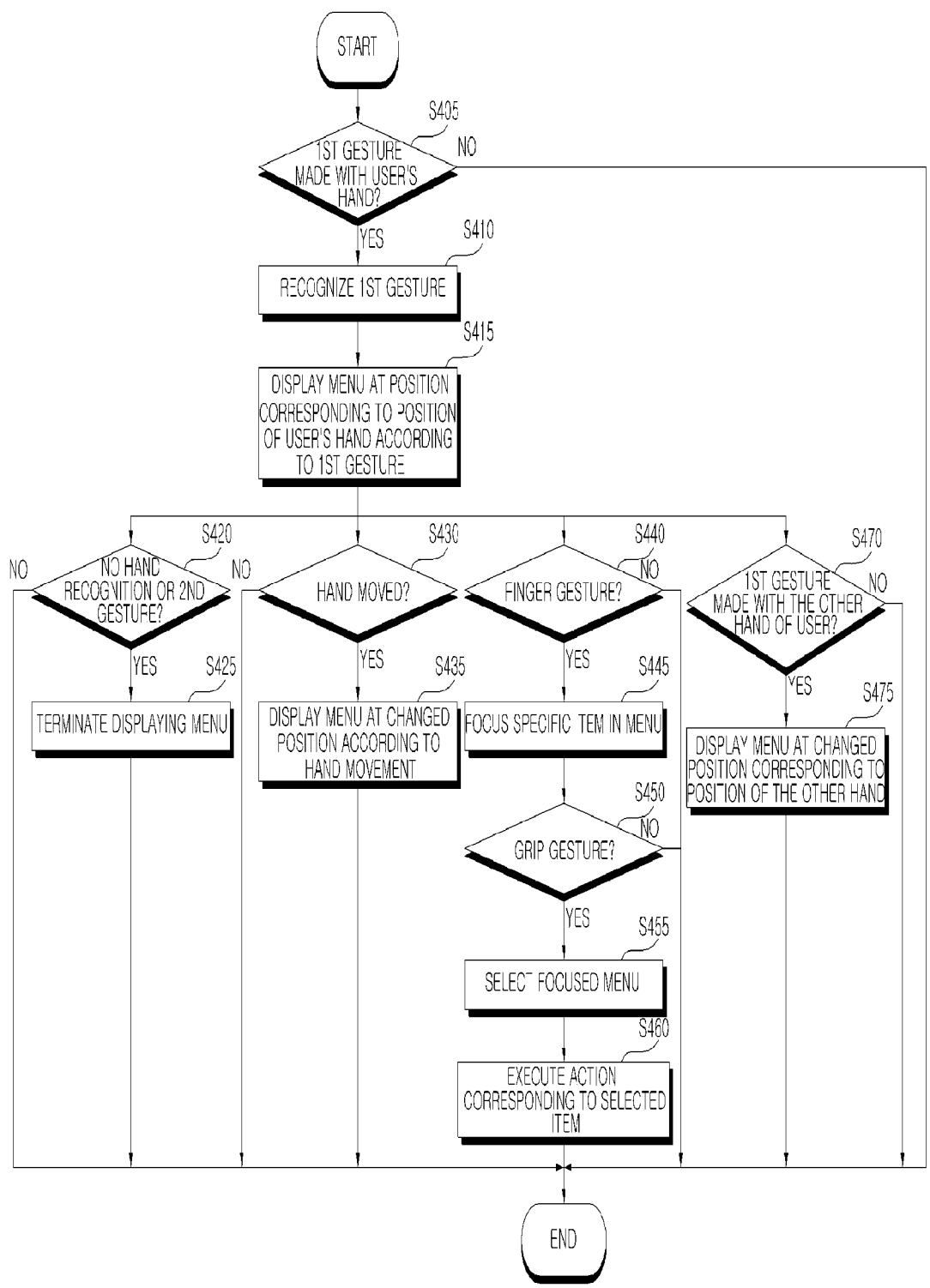
FIG. 4 is a flowchart illustrating a method for operating the image display apparatus according to an embodiment of the present invention.

FIG. 4 is a flowchart illustrating a method for operating the image display apparatus according to an embodiment of the present invention, and FIGS. 5A to 16C are views referred to for describing various examples of the method for operating the image display apparatus illustrated in FIG. 4. The method of FIG. 4 and any other methods of the present invention described herein can be implemented using the image display apparatus of FIGS. 1-3 or using other suitable device(s). Further, the use of the right hand is discussed in some examples. However, the invention is not limited to this and the use of the left hand is equally applicable. For instance, it is up to the user to decide which hand to use to make gestures/movements for the application of the present invention. Further, any one or more features described in connection with each figure among FIGS. 5A-16C can be applied to any other figure among FIGS. 5A-16C.

Referring to FIG. 4, the controller 170 of the image display apparatus 100 determines whether the user has made a first gesture with his or her hand (S405). When the user has made the first gesture with his or her hand, the controller 170 recognizes it as the first gesture (S410).

Figure 5A:
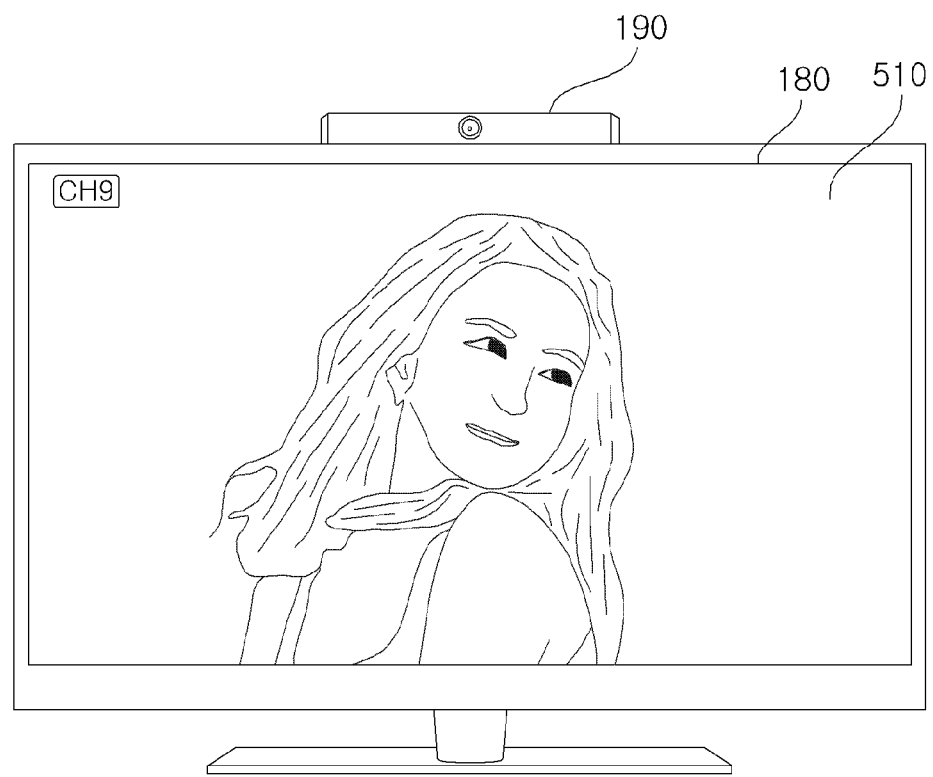
FIGS. 5A to 16C are views referred to for describing various examples of the method for operating the image display apparatus illustrated in FIG. 4 according to an embodiment of the present invention.
Figure 5A:
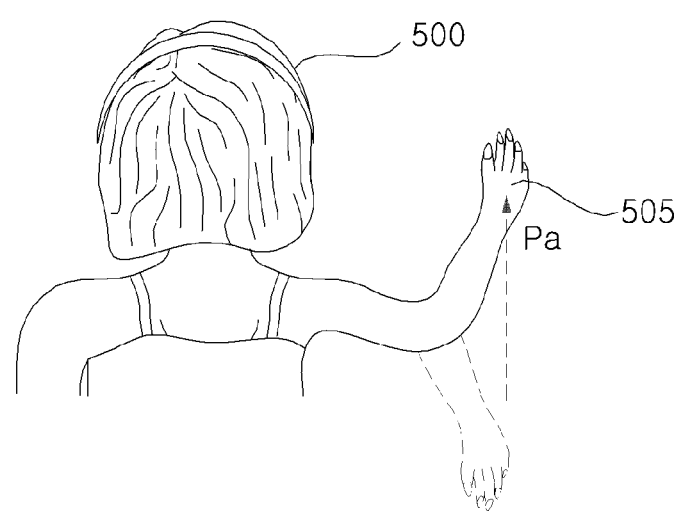

FIG. 5A illustrates an example in which a user 500 makes a gesture of raising the user's right hand 505 to a position Pa, while the user 500 is viewing a broadcast image 510 of a specific channel (e.g., CH 9) on the display 180 of the image display apparatus 100.

Figure 5B:
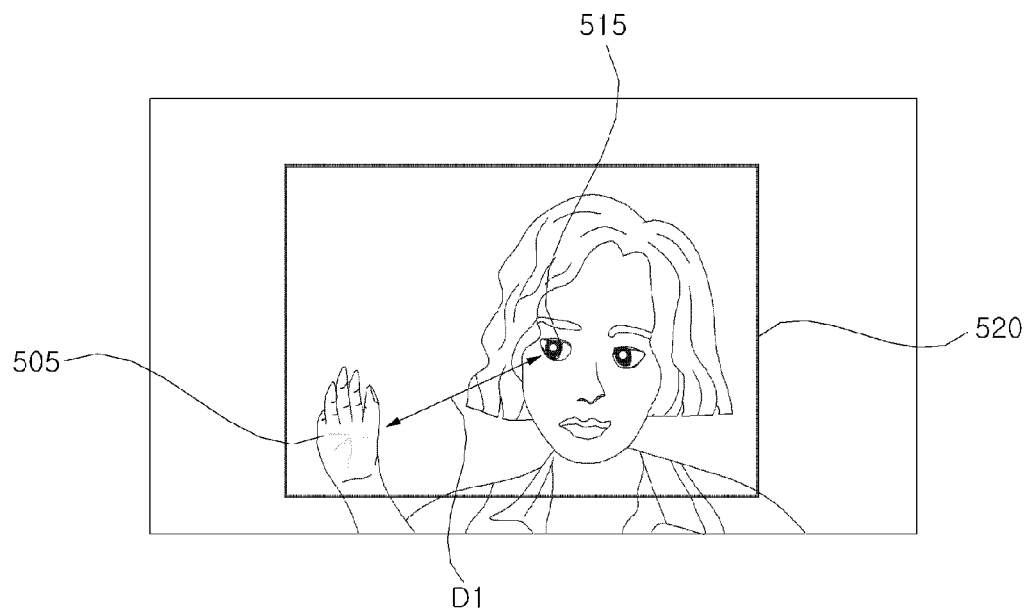

The camera 190 of the image display apparatus 100 captures an image of the user 500. FIG. 5B illustrates an exemplary image 520 captured by the camera 190. In FIG. 5B, the image 520 is captured at the moment the user raises the right hand 505.

The camera 190 may capture successive images of the user and provide the captured images to the controller 170.

The controller 170 may receive an image captured by the camera 190 before the user raises the right hand 505. In this case, the controller 170 may process the image, determining that any particular gesture has not been made. Meanwhile, the controller 170 may recognize only the face of the user (face 515 in FIG. 5B).

Then the controller 170 may receive the image 520 at the moment the user raises the right hand 505 from the camera 190, as illustrated in FIG. 5B.

The controller 170 may measure the distance D1 between the user's face 515 and the right hand 505 and compares the distance D1 with a reference distance Dref. The reference distance Dref may be stored in the memory 140. If the distance D1 is equal to or smaller than the reference distance Dref, the controller 170 may recognize the currently detected gesture as a predefined first gesture. As a variation in another example, when both the face and hand of the user are captured as shown in the camera image of FIG. 5B, then the controller 170 recognizes the currently detected gesture as the predefined first gesture.

Then the image display apparatus 100 displays, on the display 180, a specific menu at a position corresponding to the position of the user's hand according to the first gesture (S415). That is, upon recognition of the first gesture, the controller 170 controls displaying of the specific menu at the position corresponding to the position of the user's hand. The phrase "at the position corresponding to the position of the user's hand" for the purpose of displaying the menu on the display preferably means mapping (or correlation) occurs between the location of the hand in the captured image (FIG. 5B) to the location of the image/screen of the display.

Figure 5C:
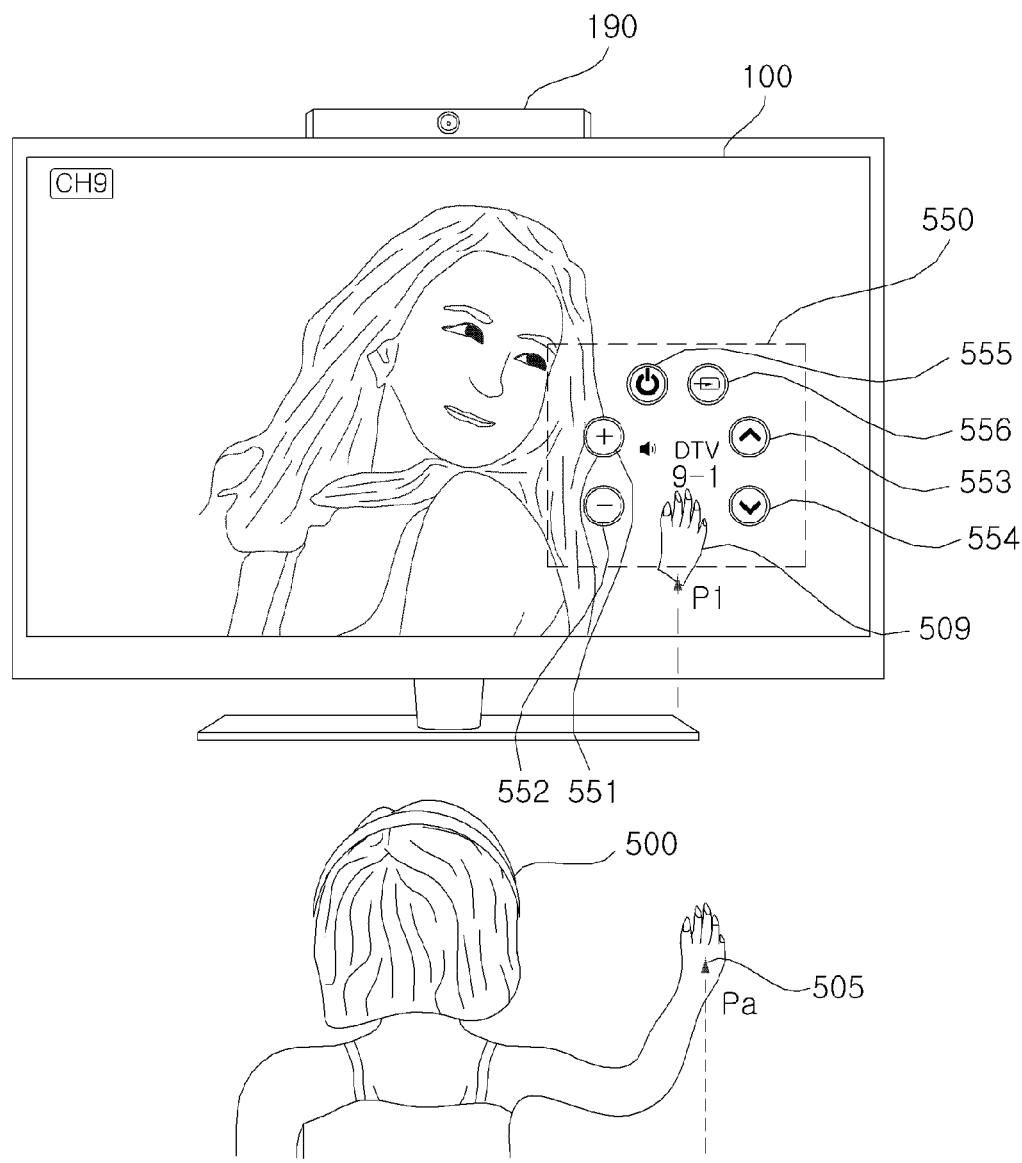

Specifically, the OSD generator 340 of the controller 170 may generate a menu corresponding to the gesture recognized by the processor 330. As illustrated in FIG. 5C, the OSD generator 340 or the controller 170 may generate a menu at the position on the screen corresponding to the recognized first gesture of raising the right hand.

The mixer 345 of the controller 170 may mix a broadcast video signal processed by the video processor 320 with the menu corresponding to the first gesture, where the menu may be generated by the OSD generator 340. The displaying position of the menu on the display 180 may be determined according to the detected position of the user's hand.

As illustrated in FIGS. 5A and 5C, if the user's right hand 505 is at a position Pa, the menu may be displayed at a first position P1 corresponding to the position Pa on the display 180. For instance, the controller 170 may determine and use the position Pa of the user's hand in the captured image of FIG. 5B to generate the first position P1 at which the menu may be displayed, which would correspond to or map to the position Pa. Further, if the user moves the right hand 505 to another location, then the menu may be moved correspondingly to another location on the display 180.

FIG. 5C is an exemplary view illustrating display of a menu 550 including a plurality of items at the first position P1 corresponding to the position Pa of the right hand 505 of the user 500, along with the broadcast image 510 on the display 180. Since a menu is displayed in correspondence with the position of the user's hand on the display 180 in this manner, the menu can be displayed in a user-intended area, thereby increasing user convenience.

In the illustrated case of FIG. 5C, the menu 550 includes volume control items 551 and 552 for adjusting sound volume, channel switching items 553 and 554 for switching channels, a power-off item 555 for powering off the image display apparatus 100, and an external input item 556 for allowing the user to view an external input image. The menu 550 may further include information about an image that the user is viewing, for example, channel information DTV 9-1 in the case of a broadcast image received through channel 9.

A pointer 509 indicating the position of the user's hand may be displayed over the menu 550. While the pointer 509 takes the form of a hand, it may be configured in various manners. Further, the pointer 509 may not be displayed or may be selectively displayed in any known manner.

Figure 6A:
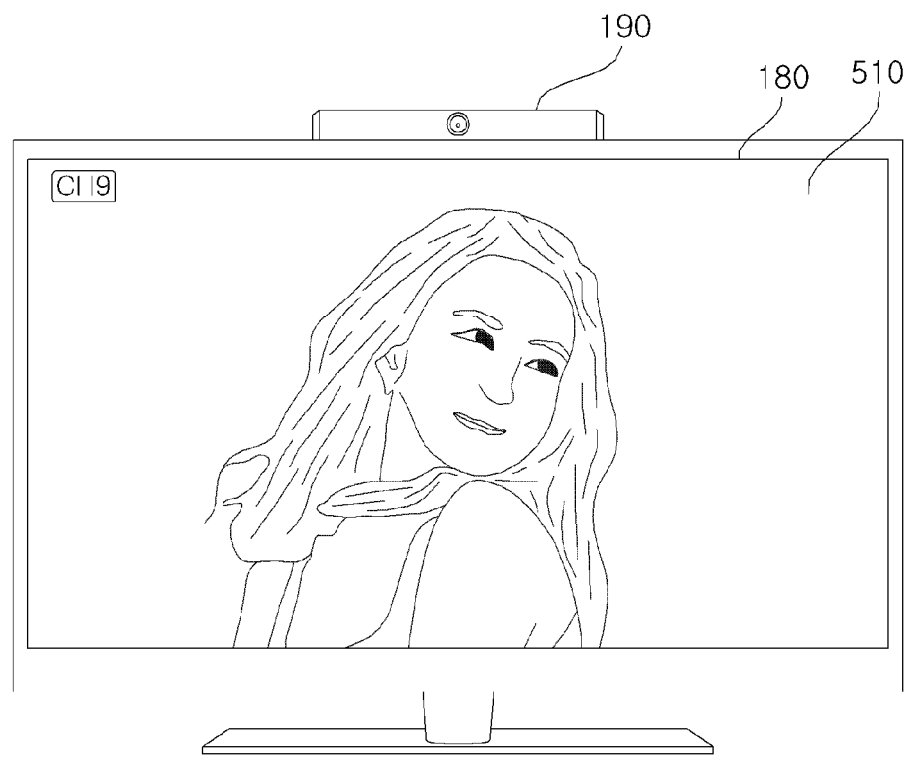
Figure 6A:
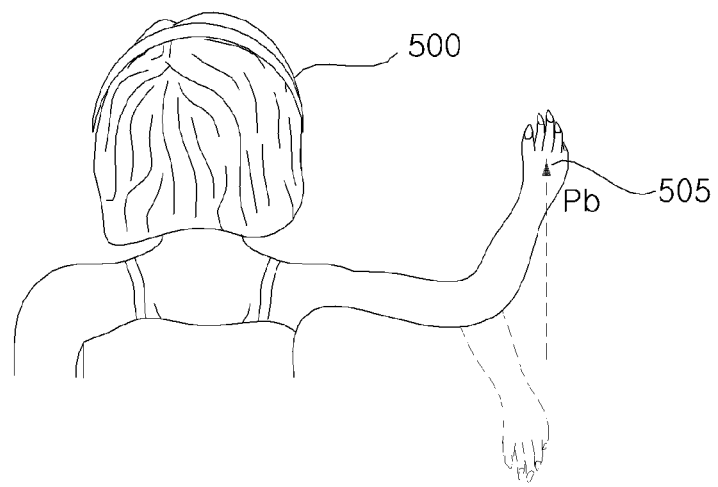

FIG. 6A illustrates an example in which the user 500 raises the right hand 505 to a position Pb, while viewing the broadcast image 510 of the specific channel CH 9 on the image display apparatus 100.

Figure 6B:
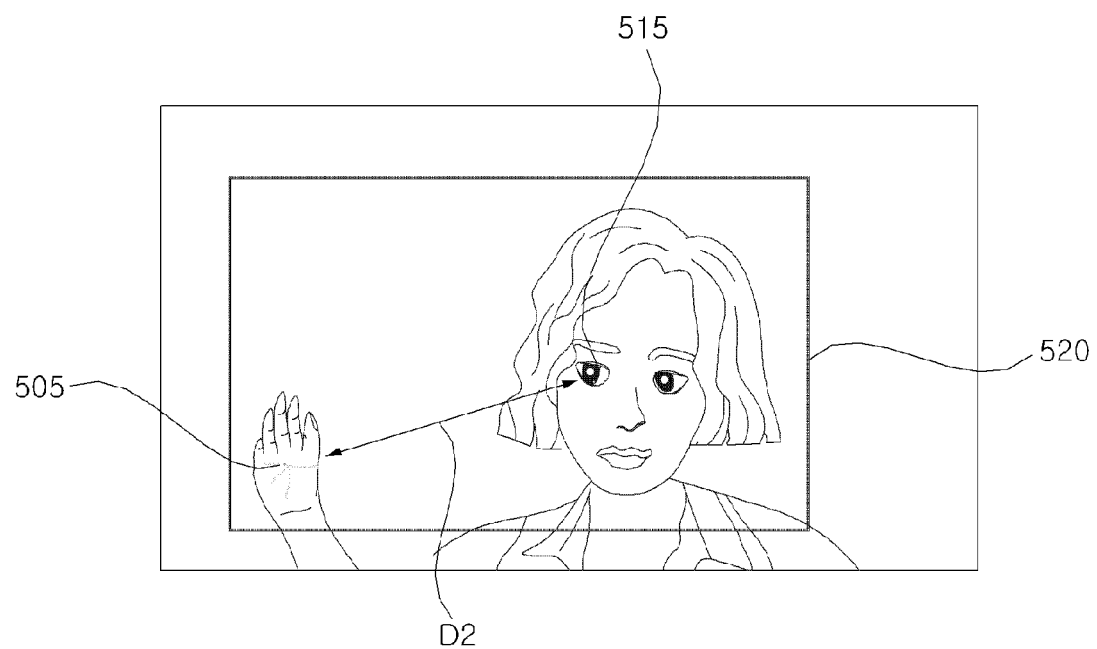

The controller 170 may receive the image 520 captured by the camera 190 at the moment the user raises the right hand 505, as illustrated in FIG. 6B.

Then from the captured image, the controller 170 may measure a distance D2 between the user's face 515 and the user's right hand 505 and compare the distance D2 with the reference distance Dref. If the distance D2 is equal to or smaller than the reference distance Dref, the controller 170 may recognize the current hand-raising gesture as a predefined first gesture.

Referring to FIG. 6A, the user's right hand is located at the position Pb, which is farther away from the user's face than the position Pa in FIG. 5A. In this case, the controller 170 may display the menu 550 at a second position P2 corresponding to the position Pb, on the display 180 as shown in FIG. 6C.

Figure 6C:
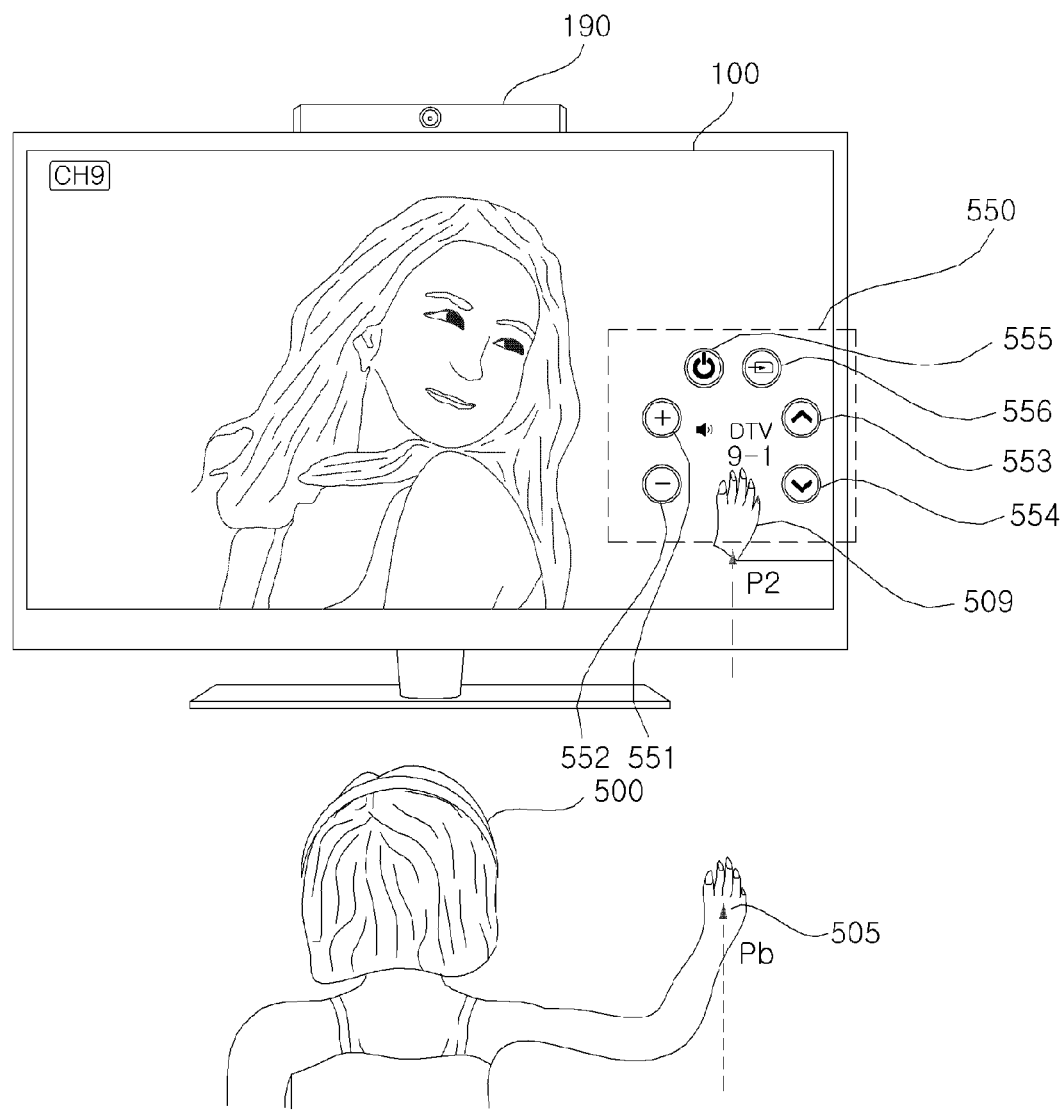

More specifically, as shown in FIG. 6C, the menu 550 including a plurality of items is displayed at the second position P2 corresponding to the position Pb of the right hand of the user 500, along with the broadcast image 510 on the display 180. Since the menu is displayed in correspondence with the current position of the user's hand on the display in this manner, the menu can be displayed in a user-intended area, thereby increasing user convenience.

In the illustrated case of FIG. 6C, the menu 550 includes the volume control items 551 and 552 for adjusting sound volume, the channel switching items 553 and 554 for switching channels, the power-off item 555 for powering off the image display apparatus 100, and the external input item 556 for allowing the user to view an external input image. The menu 550 may further include information about an image that the user is viewing, for example, channel information DTV 9-1 in the case of a broadcast image. The pointer 509 is also displayed at a position corresponding to the current position of the user's hand 505.

Returning to FIG. 4, after the menu is displayed on the display 180 due to the first gesture's detection at step S415, the image display apparatus 100 continues to monitor the captured image of the camera 190 and based on this monitoring, determines if the user's hand is no longer recognized or a predefined second gesture (e.g., lowering of the right hand to a no gesture position) has been made (S420). If the user's hand is no longer recognized or the second gesture such as lowering of the right hand has been made (indicating the user's intention to not enter any input to the menu), the image display apparatus 100 discontinues to display the menu 550 such that the menu 550 disappears from the display 180 (S425).

For instance, while the menu 550 is displayed, if the user's hand is no longer recognized in an image captured by the camera 190 or the second gesture of lowering the user's hand has been detected from the image captured by the camera 190, the controller 170 controls discontinuation of displaying the menu 550.

When the user makes the second gesture by lowering the right hand 505, the controller 170 may control discontinuation of displaying the menu 550, determining that the user currently has no intention of applying a user input to the menu 550. That is, in that case, only the broadcast image 510 may be displayed as illustrated in FIG. 6A.

As a variation, if the camera 190 cannot capture an image due to malfunction, the controller 170 may control discontinuation of displaying the menu 550 because a user input cannot be provided by a user gesture.

After step S415, the image display apparatus 100 can also determine whether the right hand has moved to another gesturing location (S430). If the user moves the right hand to another gesturing location, the image display apparatus 100 moves the displayed menu 500 to a changed position in correspondence with the right hand's movement (S435).

More specifically, the controller 170 monitors the movement of the user's hand. If the hand has moved, the controller 170 may control displaying of the menu at a new position corresponding to the hand's displacement. This example is discussed referring to FIGS. 7A-7C.

Figure 7A:
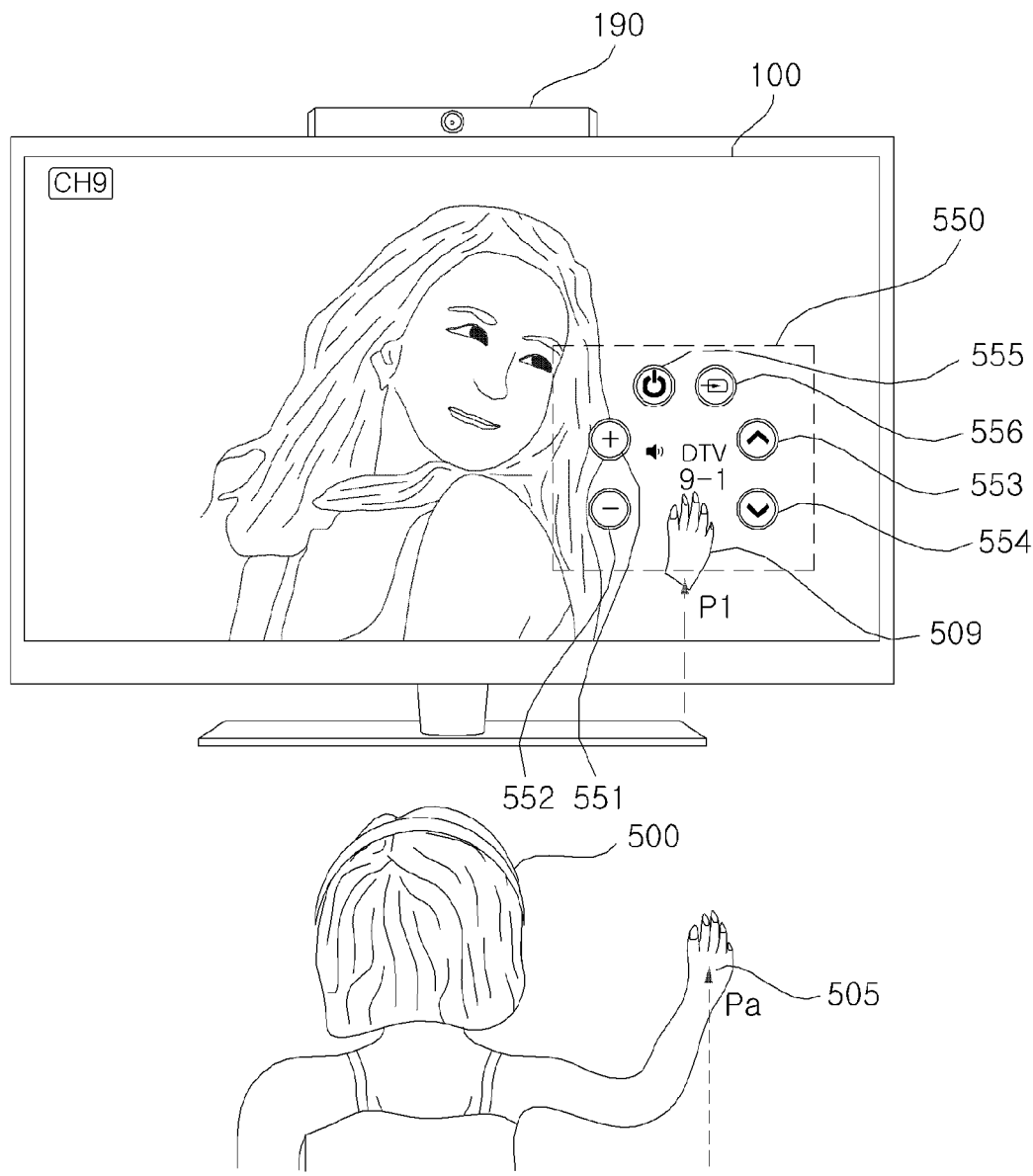

FIG. 7A is an exemplary view illustrating that the menu 550 is displayed at the first position P1 of the display 180 in response to the recognized first gesture of raising the right hand 505 to the position Pa.

Figure 7B:
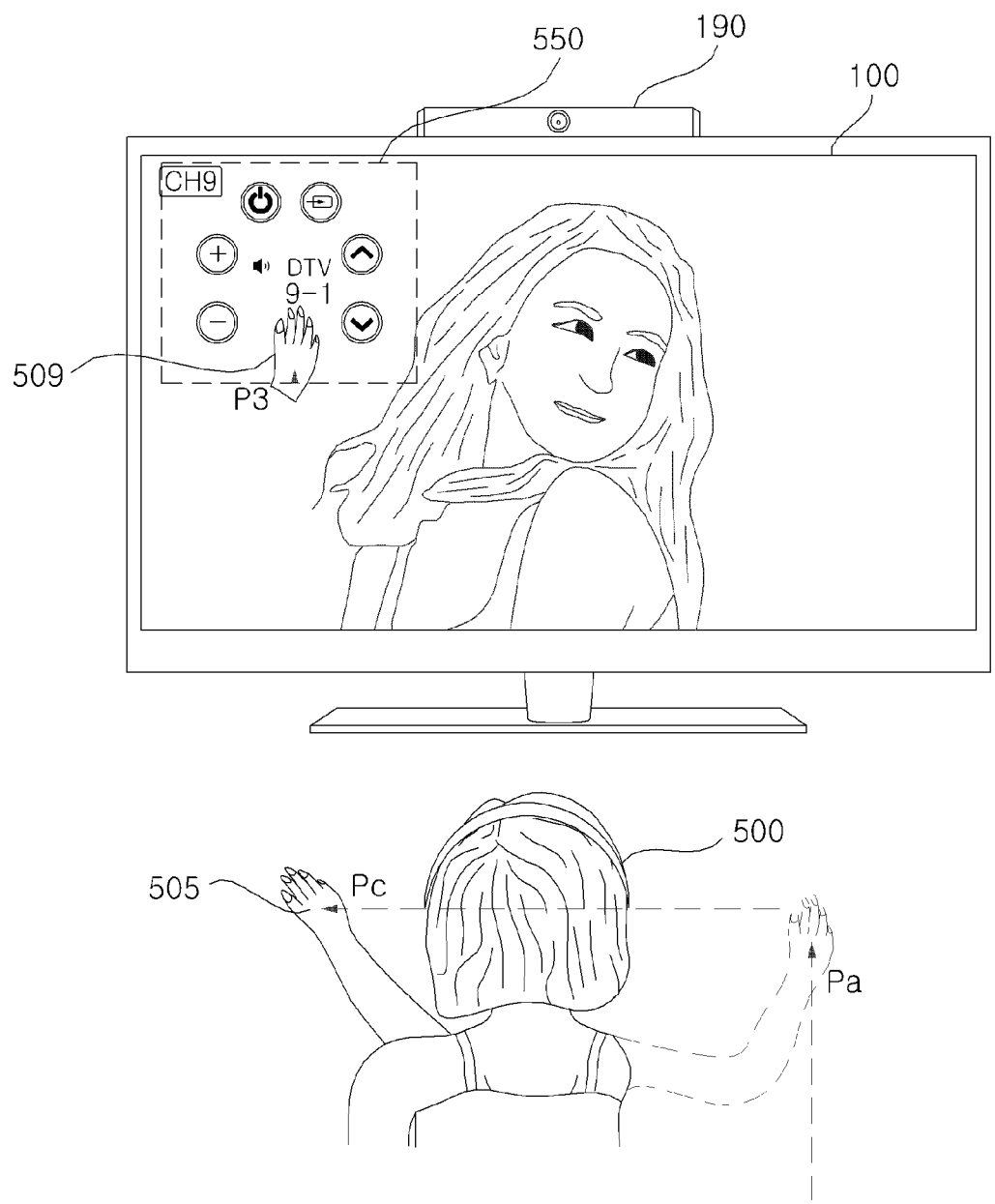

FIG. 7B is an exemplary view illustrating that the user 500 has now moved the right hand 505 from the position Pa to a position Pc. Thus, the controller 170 senses this movement of the user's hand 505 based on an image captured by the camera 190 and may display the menu 550 at a shifted position (P3) corresponding to the displacement of the user's hand.

In FIG. 7B, the menu 550 on the display 180 is shifted from the first position P1 to a third position P3 in response to the displacement of the user's right hand 505 from the position Pa to the position Pc. That is, the user can move the menu 550 being displayed on the display 180 to any user-preferred location by moving the right hand 505 accordingly. Accordingly, a menu can be displayed in a user-intended area, thereby increasing user convenience.

Figure 7C:
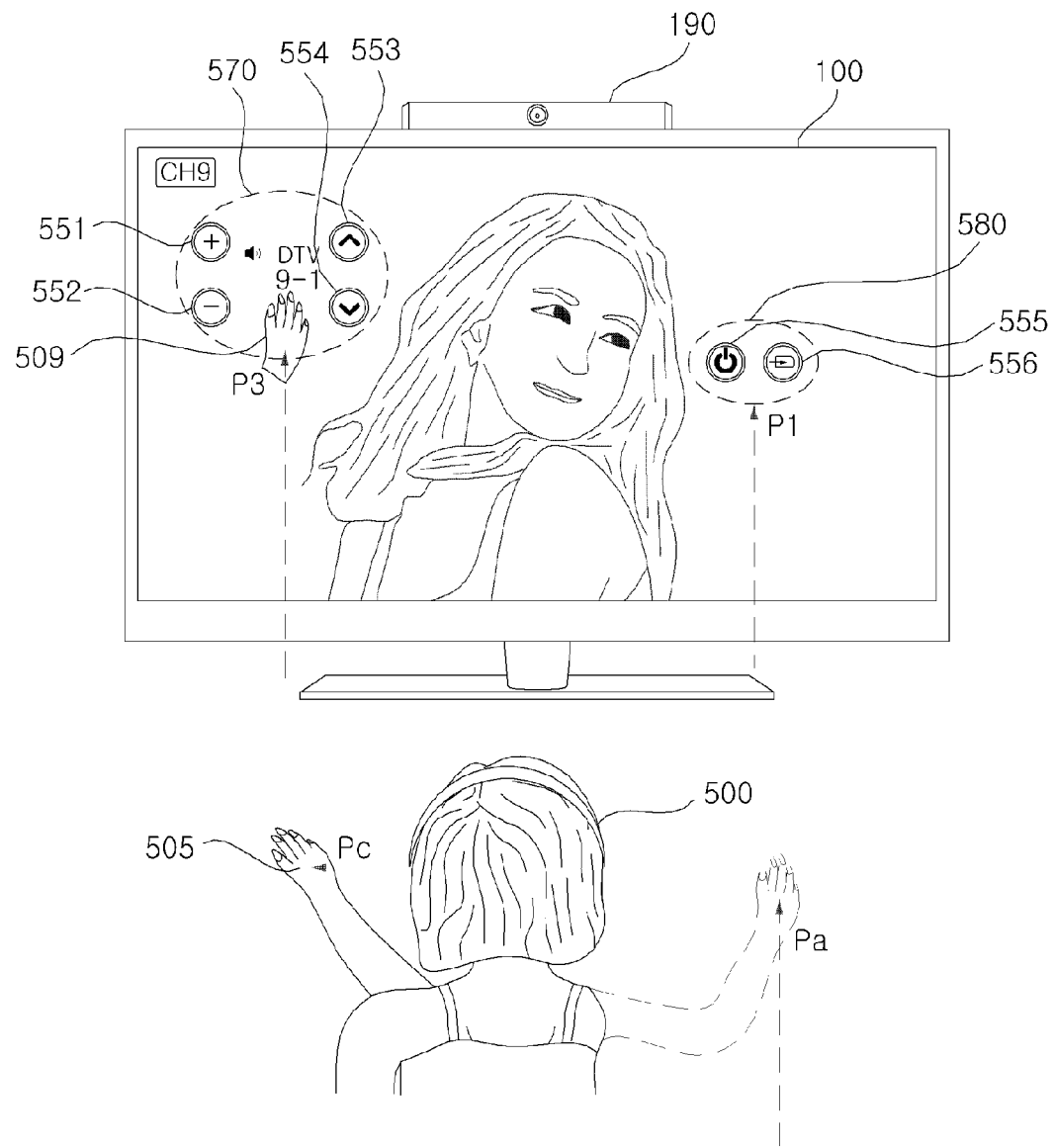

FIG. 7C is an exemplary view illustrating that some items 570 of the menu 550 are shifted from the first position P1 to the third position P3 in response to the displacement of the user's right hand from the position Pa to the position Pc, while the other items 580 of the menu 550 are still kept at the first position P1.

For example, as illustrated in FIG. 7C, the volume control items 551 and 552 and the channel switching items 553 and 554 that are frequently used may be shifted from the first position P1 to the third position P3, whereas the power-off item 555 and the external input item 556 that are not used frequently may be kept at the first position P1. According to this variation, since a menu can be displayed in user-intended area(s) in this manner, user convenience can be further increased.

Many settings other than one illustrated in FIG. 7C are available.

After step S415, the image display apparatus 100 can also determine whether a finger gesture has been made (S440). If the user has made a gesture with a finger, the image display apparatus 100 focuses on a specific item in the menu in correspondence with the finger (S445).

With the menu displayed on the display 180, the controller 170 monitors input of a finger gesture. If the user has made a gesture with a finger, the controller 170 focuses on a specific item in the menu which corresponds to the finger gesture. This operation will be discussed referring to FIGS. 8A-8D FIG. 8A is an exemplary view illustrating displaying of the menu 550 on the display 180 in response to the recognized first gesture of raising the user's right hand 505 to a specific position. This operation has been discussed in connection with steps S405-S415.

Figure 8A:
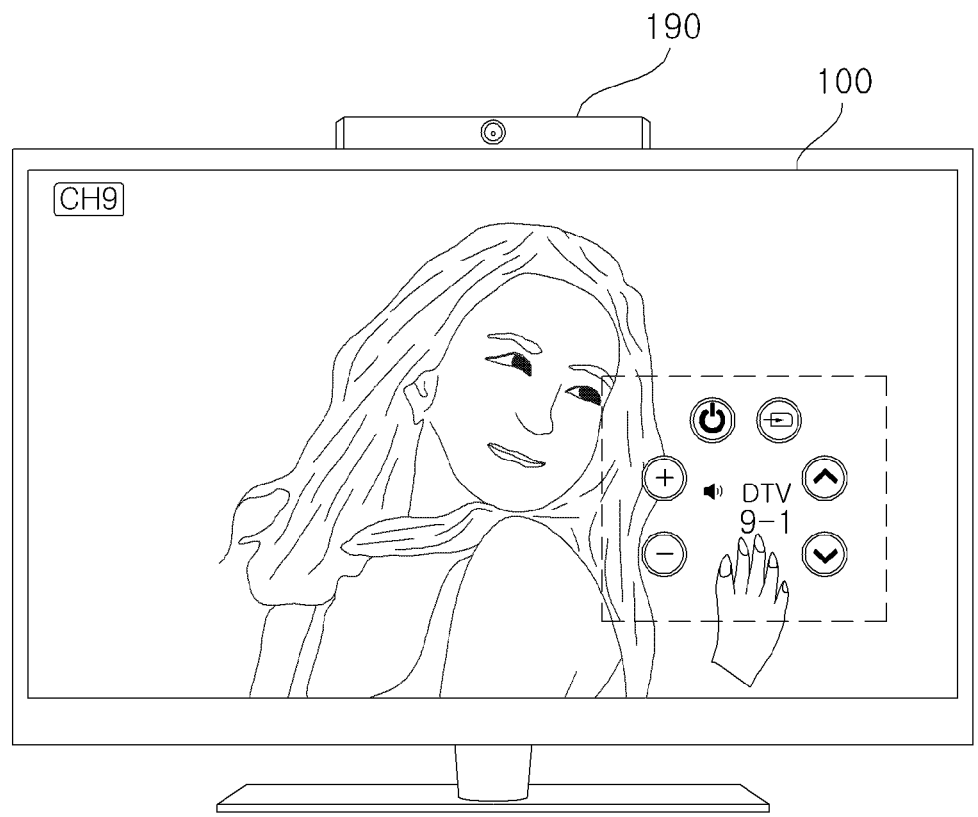
Figure 8A:
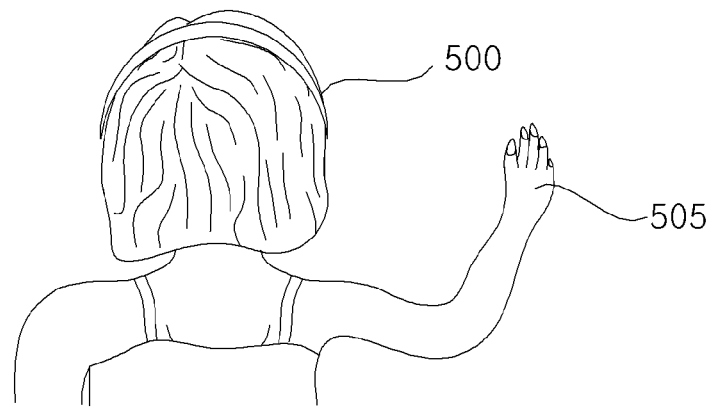
Figure 8B:
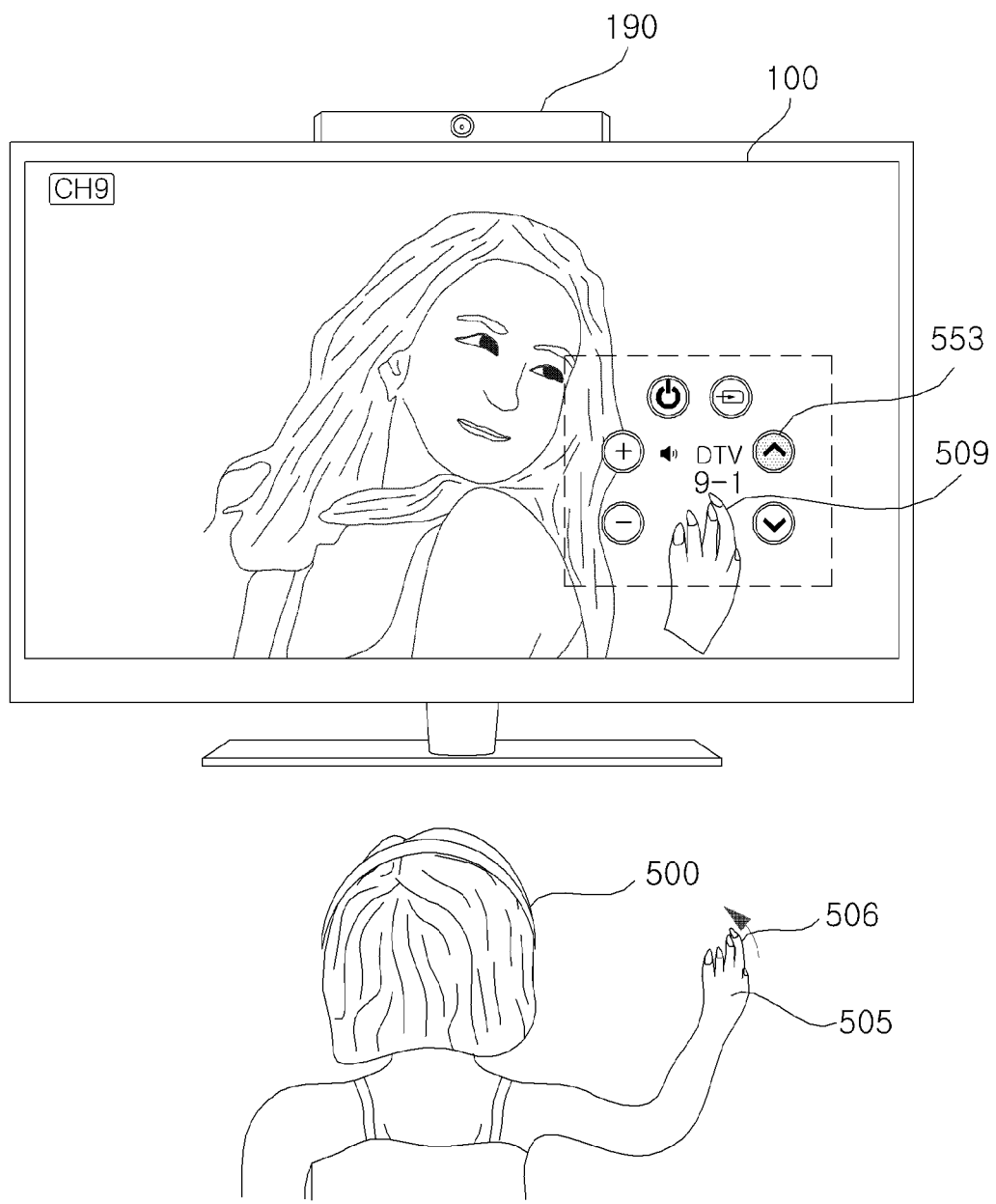

FIG. 8B is an exemplary view illustrating that the user makes a gesture with the fourth finger (ring finger) 506 of the right hand 505, while the menu 550 is displayed on the display 180.

Then the controller 170 may sense this finger gesture made by the right hand from an image captured by the camera 190. Particularly, the controller 170 may identify a finger that has made a largest movement among the five fingers and thus determine that the user has made a gesture with the fourth finger 506 in this example. This fourth finger gesture may also be displayed by the pointer 509 on the display 180.

Referring to FIG. 8B, when the user has made a gesture with the fourth finger (ring finger) 506, the controller 170 may control to focus on a specific item (e.g., the channel-up item 553) of the menu 550 in correspondence with the fourth finger 506. Therefore, the user can easily focus on a specific item in the displayed menu using a finger. The finger gesture can be a movement of a finger, such as a quick bending of a finger.

To indicate that a specific item in the displayed menu is being focused by the finger gesture, at least one of the brightness, color, or size of the specific item may be changed on the display 180 so that the user can recognize which item is being focused.

In one example, different fingers of the hand can be set to correspond to different items in the menu. In the menu 550 for example, the volume-down item 552 and the volume-up item 551 may correspond to the first finger (thumb) and second (index) finger of the right hand, respectively. The power-off item 555 or the external input item 556 may correspond to the third finger (middle finger) of the right hand. The channel-up and down items 553 and 554 may correspond respectively to the fourth and fifth finger (little finger) of the right hand.

Figure 8C:
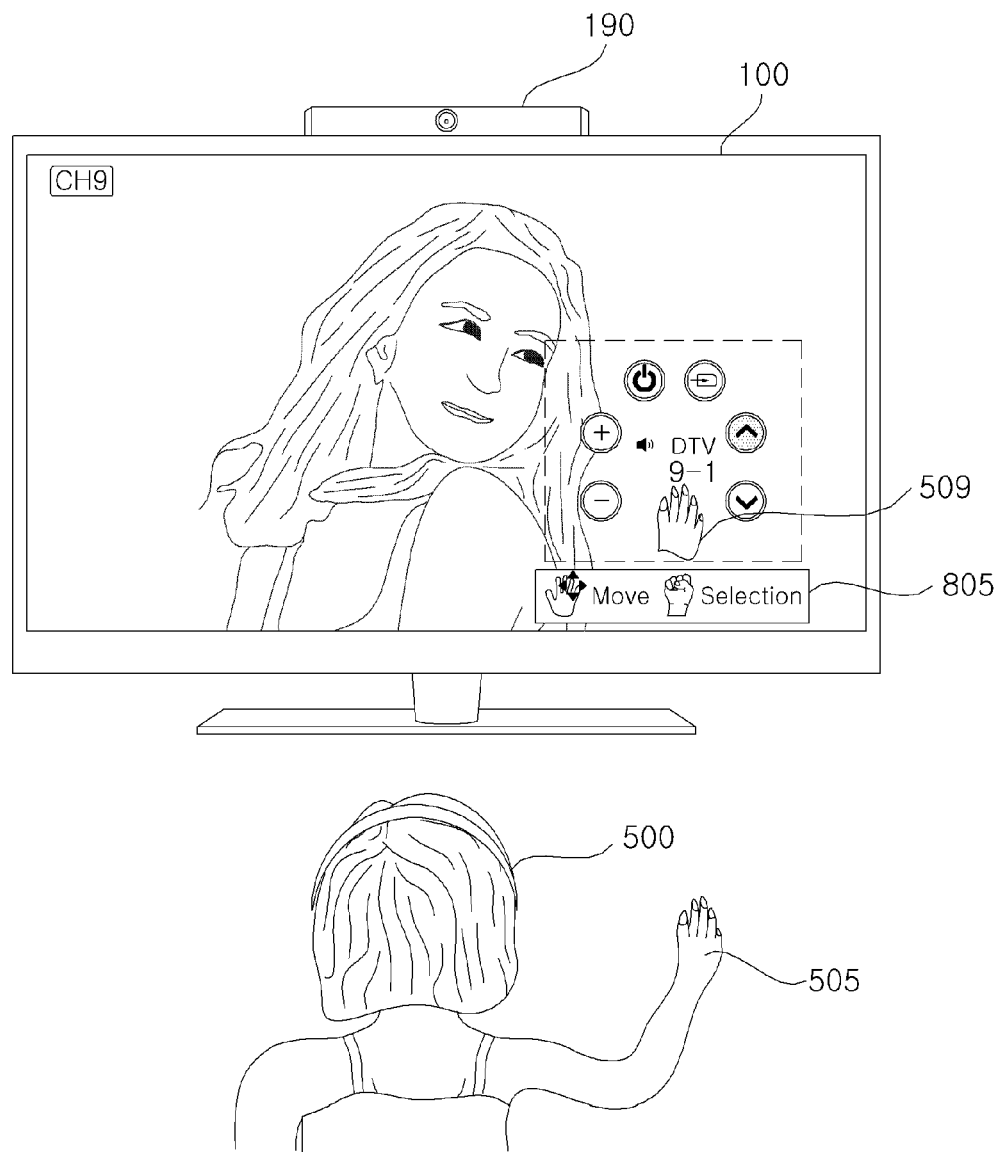

FIG. 8C is an exemplary view illustrating that a gesture guide 805 is displayed to guide an action, when an item is focused in the displayed menu.

When an item (e.g., the channel-up item 553) is focused in the displayed menu at step S445, the controller 170 may control to display the gesture guide 805 to provide guidance to the user. The gesture guide may be generated in the OSD generator 340 of the controller 170.

As a variation, once the menu is displayed and before any item of the menu is focused, the gesture guide may be displayed on the display 180. That is, while the menu 550 is displayed as illustrated in FIG. 8A, the gesture guide 805 may be displayed to provide gesture guidance to the user, as illustrated in FIG. 8C, but this occurs before any item is focused/selected.

With the item (e.g., item 553) focused in the menu, the image display apparatus 100 determines whether a grip gesture has been made (S450). If the grip gesture has been made, the image display apparatus 100 selects the focused item in response to the grip gesture (S455). Then the image display apparatus 100 executes an action corresponding to the selected item (S460).

That is, upon detection of a grip gesture with an item focused in the menu, the controller 170 selects the focused item and controls execution of an action corresponding to the selected item in response to the grip gesture.

Figure 8D:
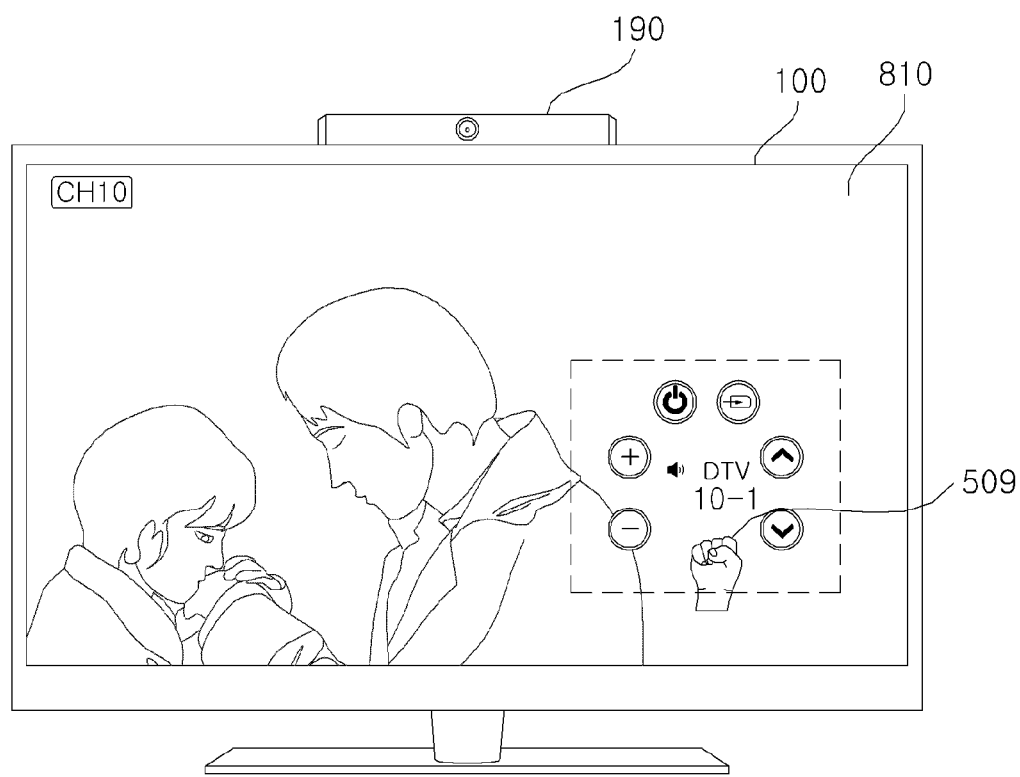
Figure 8D:
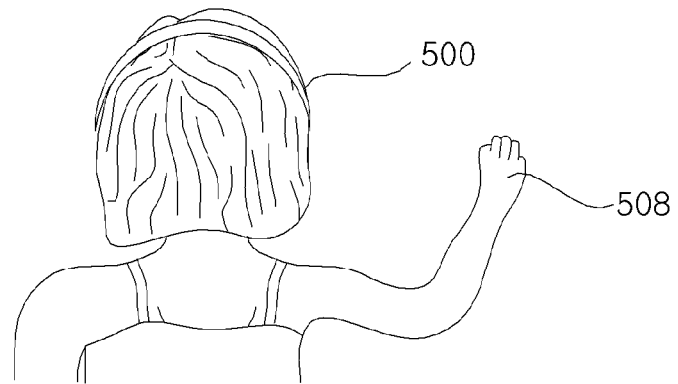

FIG. 8D is an exemplary view illustrating a grip gesture 508 of the user's right hand. When the user grips the right hand while the channel-up item 553 is being focused in the menu as illustrated in FIG. 8B or 8C, the channel-up item 553 is selected and channel switching-up is performed. On the display 180, the pointer 509 also may display the grip gesture made by the user and the pointer 509 is displayed at a position corresponding to the position of the user's hand.

That is, when the grip gesture is detected, the controller 170 performs the channel switching up from the current channel (from CH 9 to CH 10) since the channel-up item 553 is selected and executed according to the grip gesture. Thus in FIG. 8D, a broadcast image of CH 10 is displayed since the channel of a broadcast image is switched from CH 9 to CH 10. As such, the user can readily execute an intended action by using merely a grip gesture. After the grip gesture, the menu 550 may still be displayed for another user input.

If the specific item is successively selected from the menu by a user's finger gesture and grip gesture (i.e., a successive selection of the specific item is made), a scroll bar may be displayed to allow a fast search for the item. For instance, if another grip gesture succeeds to one grip gesture-incurred selection of the channel-up item 553, the channel-up item 553 may be selected successively. In this case, it is possible to display, on the display 180, a channel scroll bar for performing a fast channel-up switching through repeated grip gestures. As a consequence, an item can be more easily selected by repeated operations.

That is, when the user maintains the grip in the closed first for a predetermined time period or when the user repeatedly grips the item (in either case, a successive selection of an item has been made), then the scroll bar is shown on the screen for the item. The scroll bar allows the user to move the bar to quickly move to the desired channel using the hand gesture.

Meanwhile, a different menu may be displayed according to the type of an image that the viewer is viewing, e.g., the property of the displayed image, when the user makes the first gesture by raising the right hand. This example will be discussed referring to FIGS. 9A-10B.

Figure 9A:
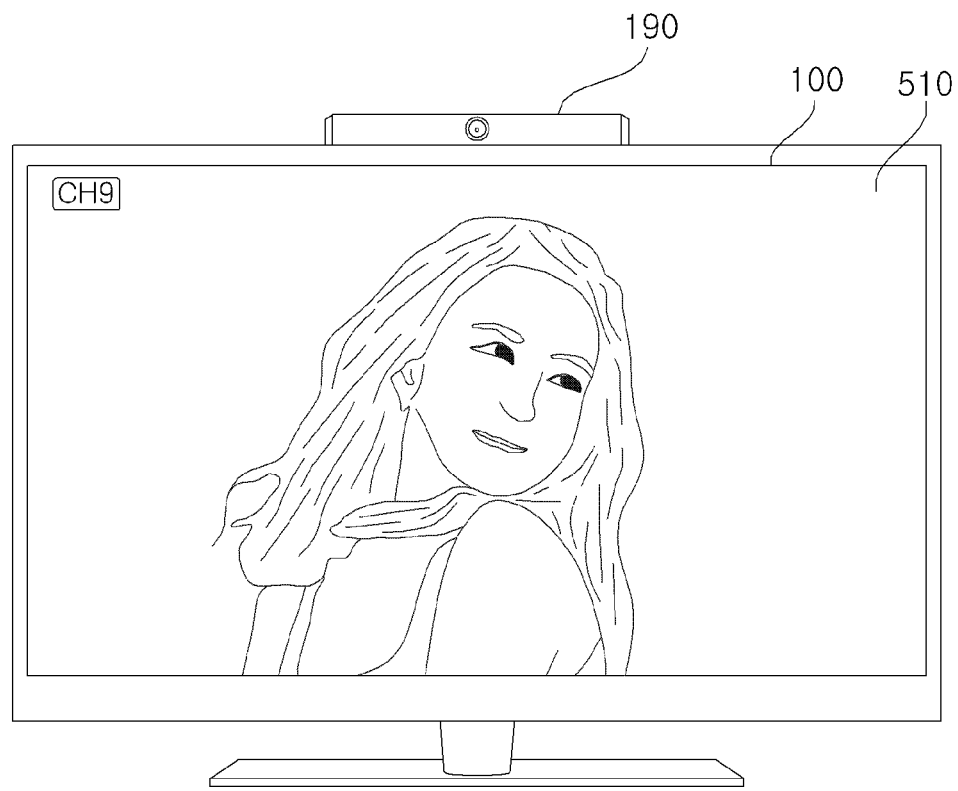
Figure 9A:
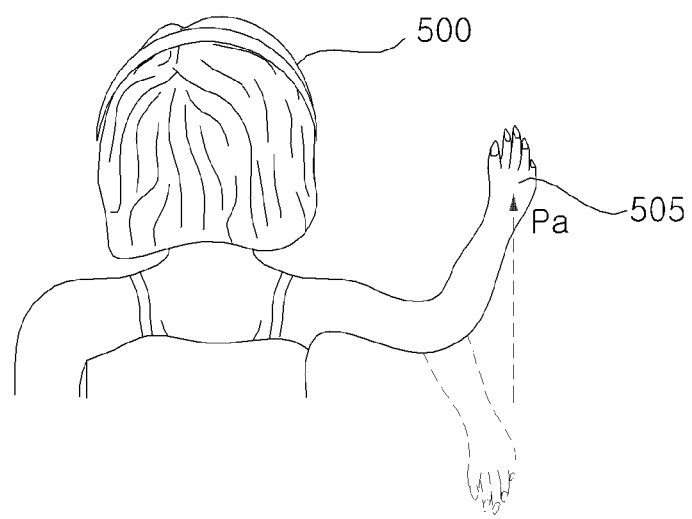
Figure 9B:
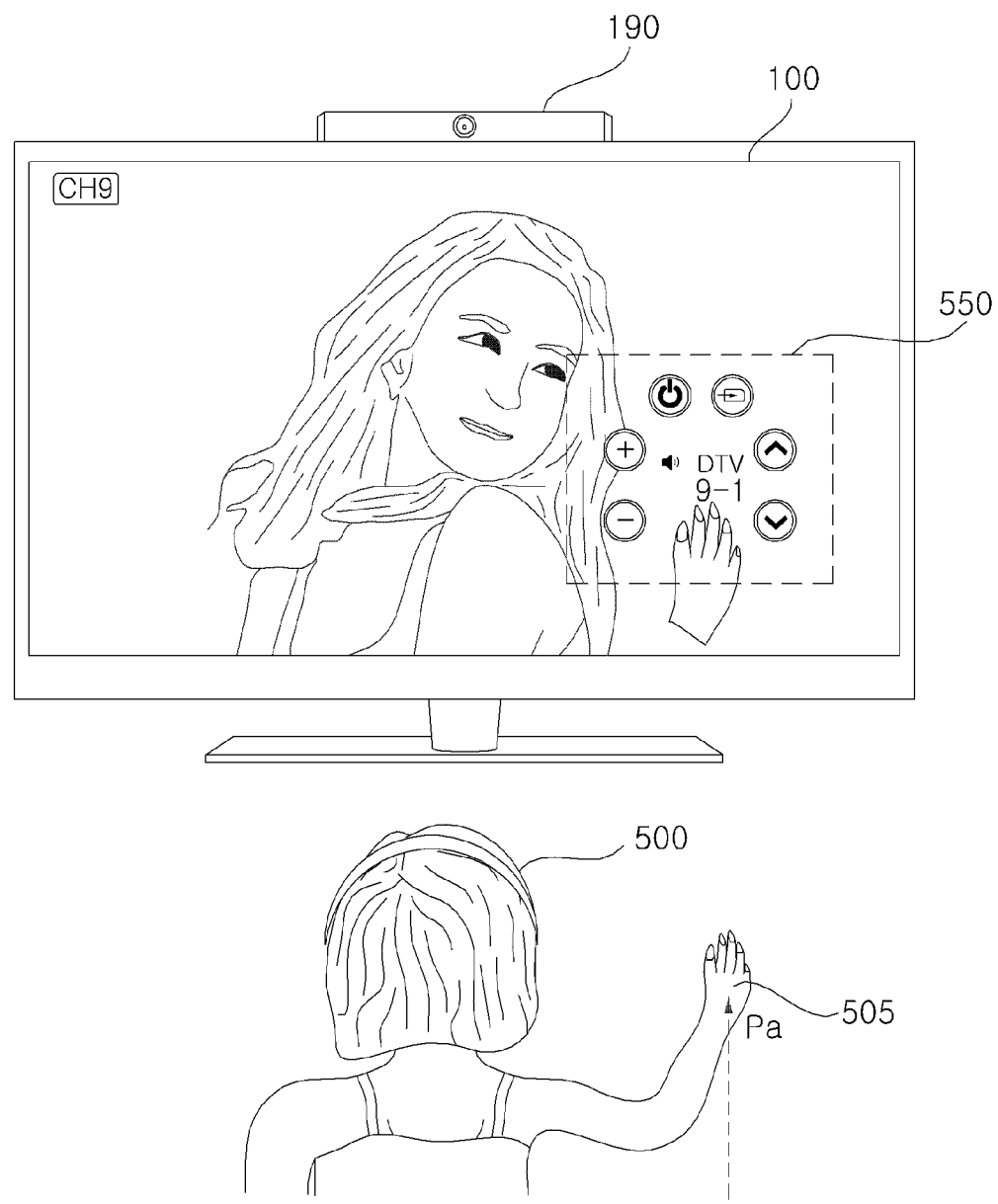

FIG. 9A is an exemplary view illustrating the first gesture that the user makes by raising the right hand 505 to a position Pa, while viewing the broadcast image 510. FIG. 9B is an exemplary view illustrating that the menu (first menu) 550 is displayed at a position corresponding to the position of the right hand 505 as a result of the first gesture, including the volume control items 551 and 552, the channel switching items 553 and 554, the power-off item 555, and the external input item 556. This operation has been discussed already in connection with the previous figures.

Figure 10A:
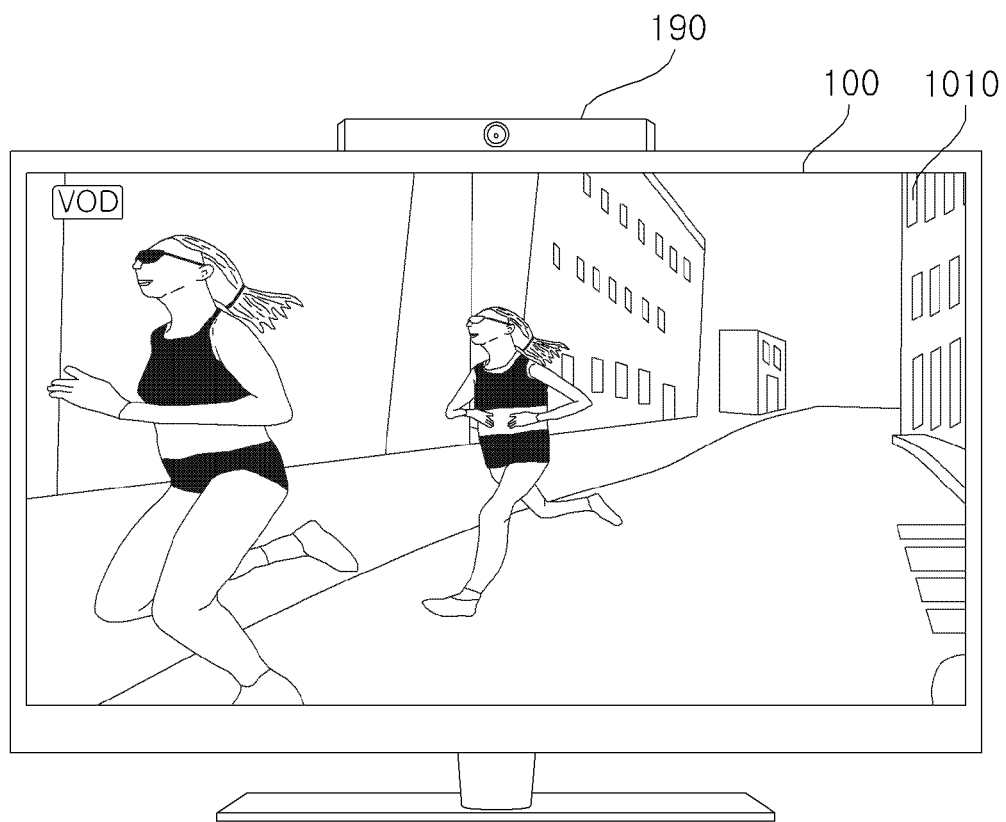
Figure 10A:
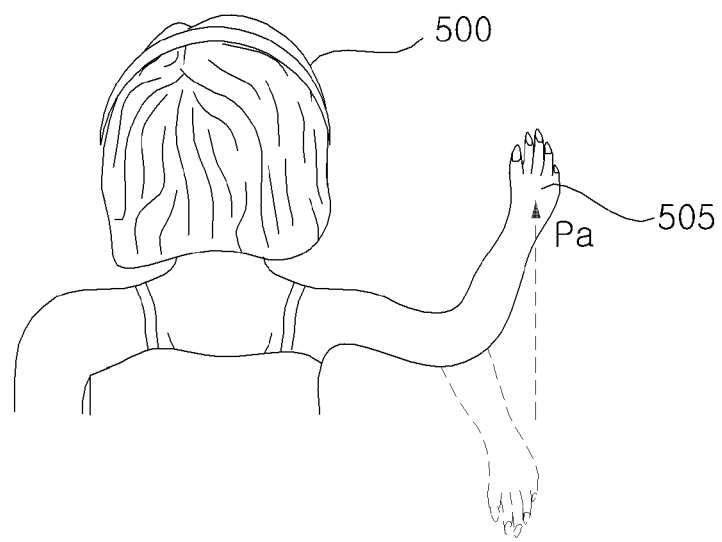
Figure 10B:
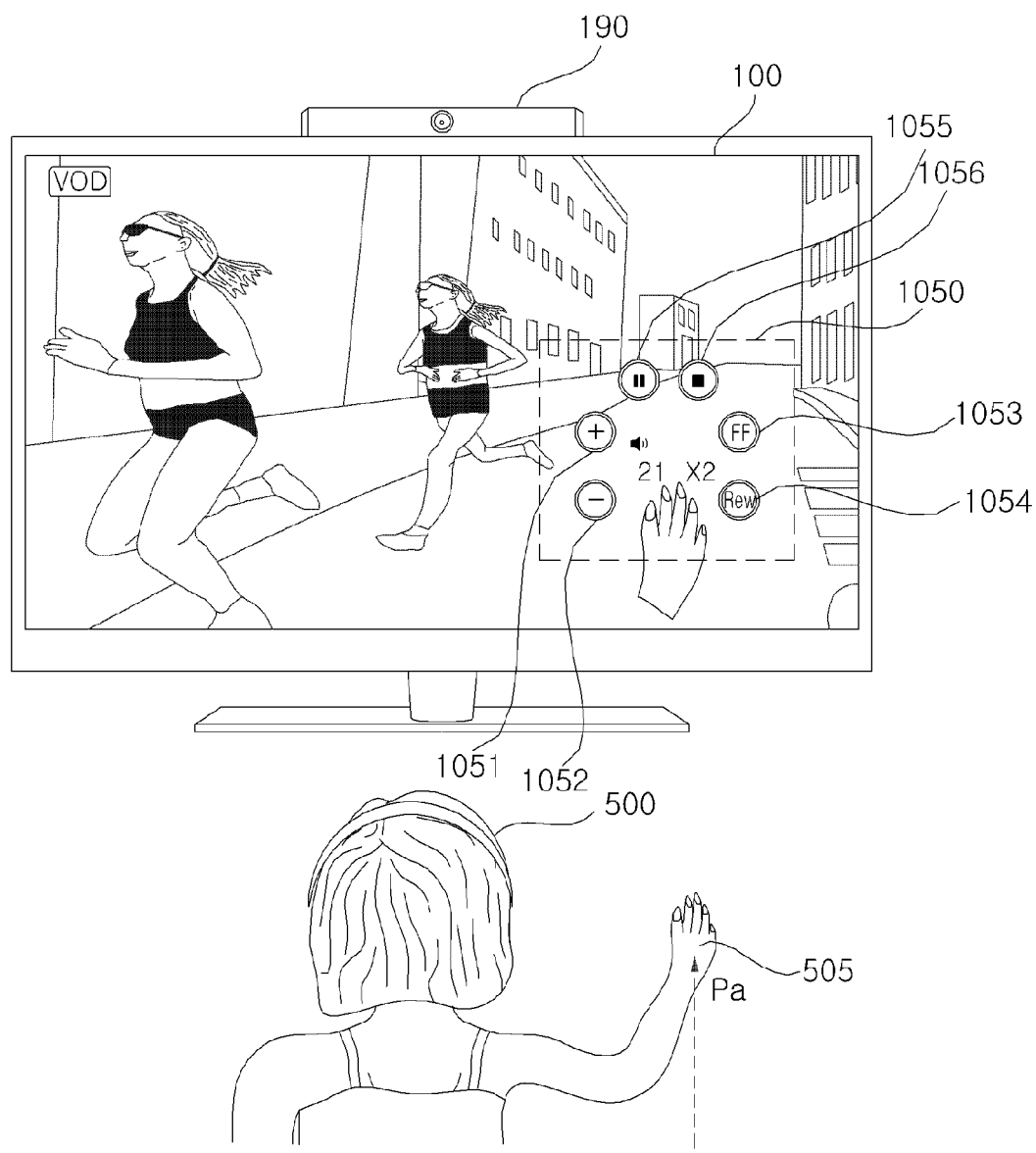

FIG. 10A is an exemplary view illustrating the first gesture that the user makes by raising the right hand 505, while viewing a Video on Demand (VoD) image 1010. FIG. 10B is an exemplary view illustrating that a second menu 1050 is displayed as a result of the first gesture, including volume control items 1051 and 1052, forward/backward items 1053 and 1054, a pause item 1055, and a stop item 1056. In this manner, a different menu is displayed according to the property of content that the user is viewing, in response to a user gesture. Depending on the type of the content being displayed on the display 180, a different menu suitable for that content may be displayed on the display 180 in response to the user's first gesture (e.g., gesture of raising the hand to a specific level/position). Therefore, user convenience can be increased.

Further, if the user makes a rotation gesture by rotating a hand after a particular menu is displayed in response to the first gesture of raising the right hand, another menu may be displayed. This example will be described in connection with FIGS. 11A-11B.

Figure 11A:
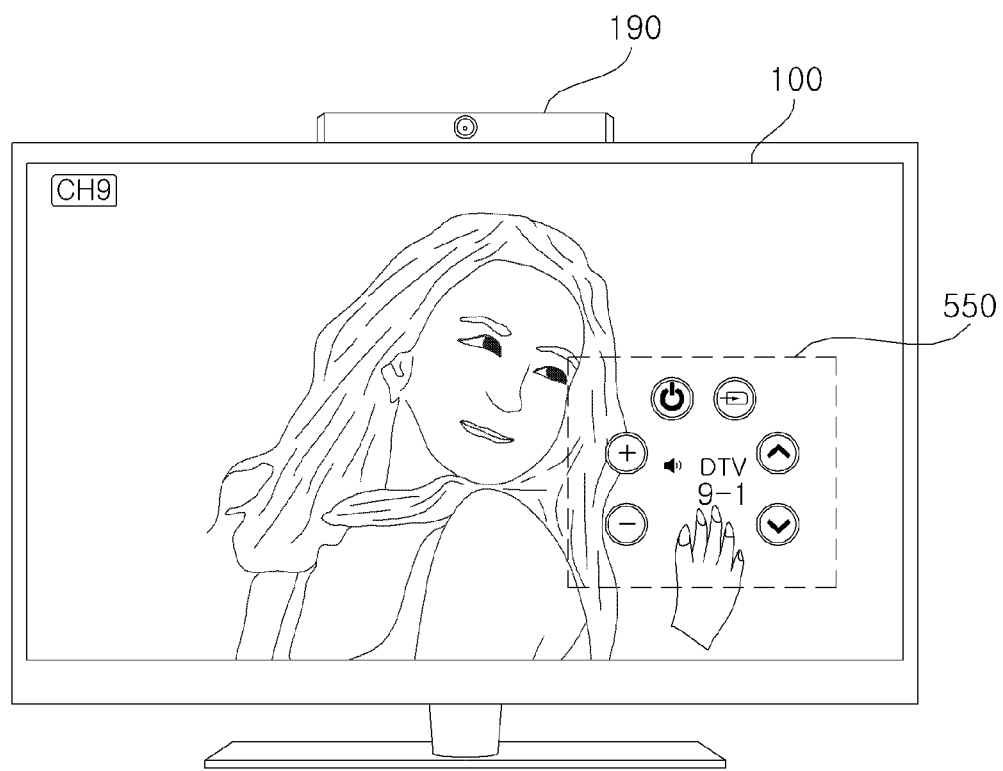
Figure 11A:
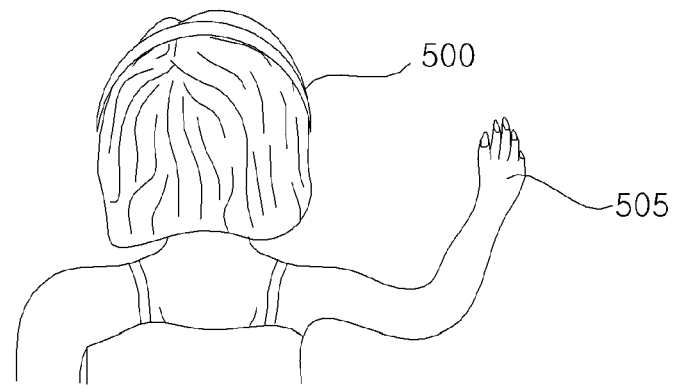

FIG. 11A is an exemplary view illustrating that the first menu 550 is displayed as a result of the first gesture, including the volume control items 551 and 552, the channel switching items 553 and 554, the power-off item 555, and the external input item 556.

Figure 11B:
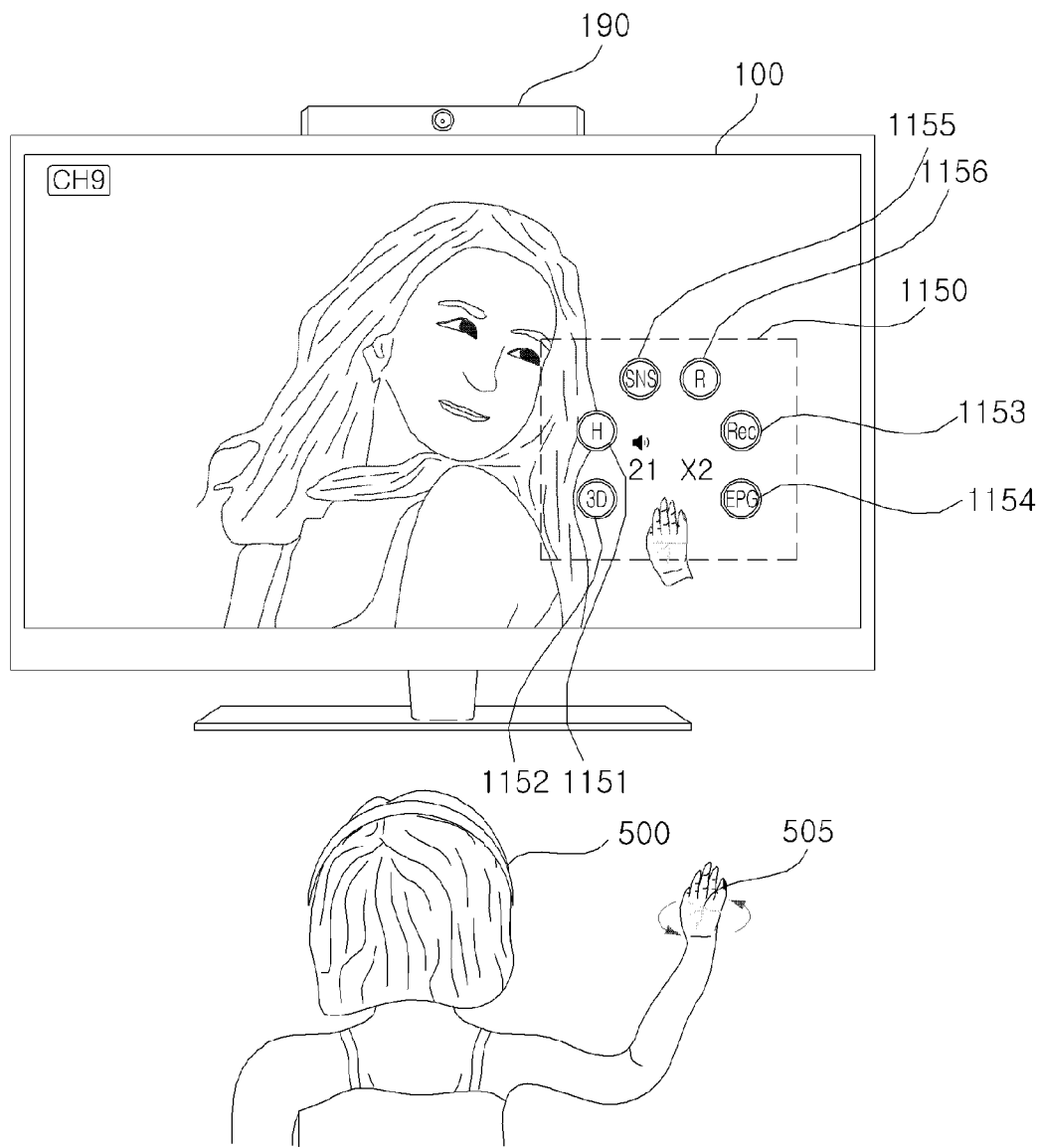

FIG. 11B is an exemplary view illustrating that in the case of FIG. 11A, when the user makes a rotation gesture by rotating the right hand to the left or right at the same position, with the first menu 550 displayed, a third menu 1150 is displayed in response to the rotation gesture. The third menu 1150 can include a home item 1151 for moving to a home screen, a 3D item 1152 for viewing a 3D image, a recording item 1153 for recording an on-going image, a broadcasting information item 1154 for viewing broadcasting information such as EPG (electronic program guide), a social network item 1155 for moving to a social network, and a recommend item 1156 for recommendation to another user. Accordingly, since another user-intended menu can be displayed by a simple rotation gesture, user convenience can be increased.

After step S415 of FIG. 4, the image display apparatus 100 can also determine that the user has made the first gesture with the other hand (S470). If the user has made the first gesture with the other hand, the menu is shifted in correspondence with the displacement of the other hand (S475).

That is, upon detection of the first gesture made with the other hand of the same user, the controller 170 may control movement of the menu in correspondence with the position of the other hand. This example will be discussed referring to FIGS. 12A-12C.

Figure 12A:
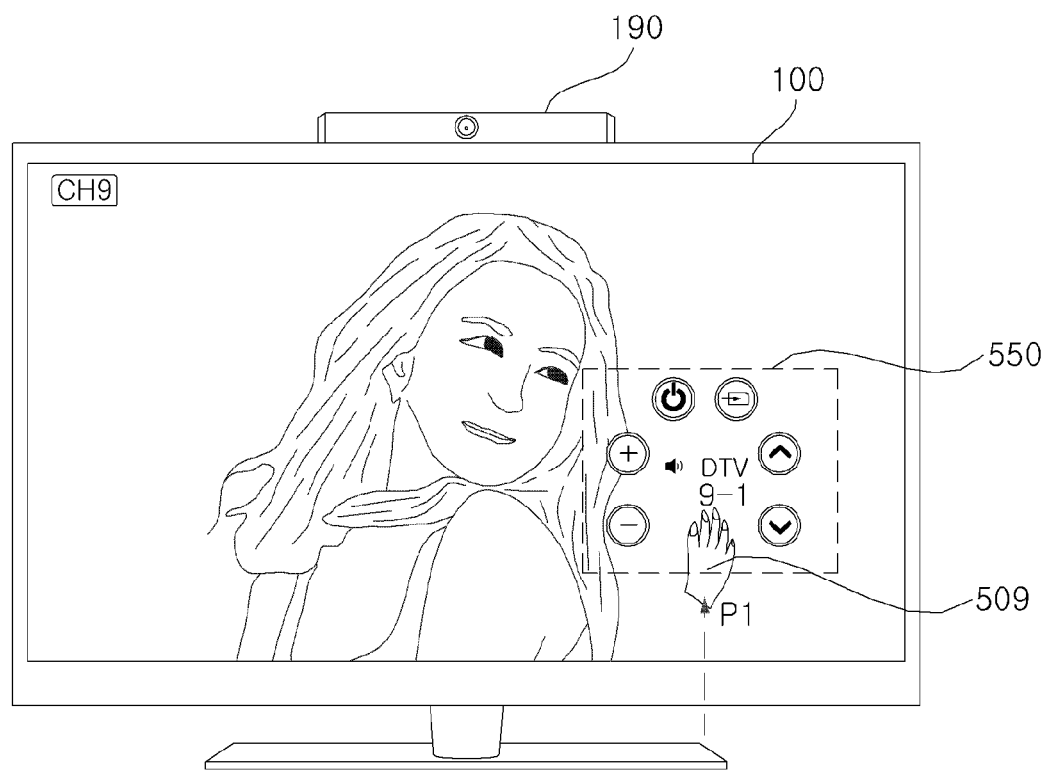
Figure 12A:
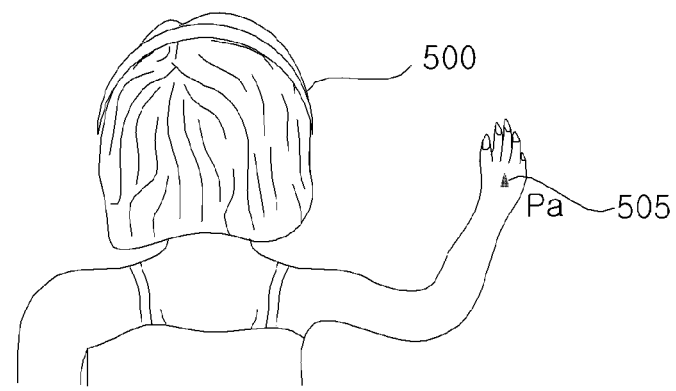

FIG. 12A is an exemplary view illustrating that the menu 550 including a plurality of items is displayed at the first position P1 corresponding to the position Pa of the right hand 505 of the user 500 in response to the first gesture of raising the user's right hand, while the user is viewing the broadcast image 510. This has been discussed previously.

Figure 12B:
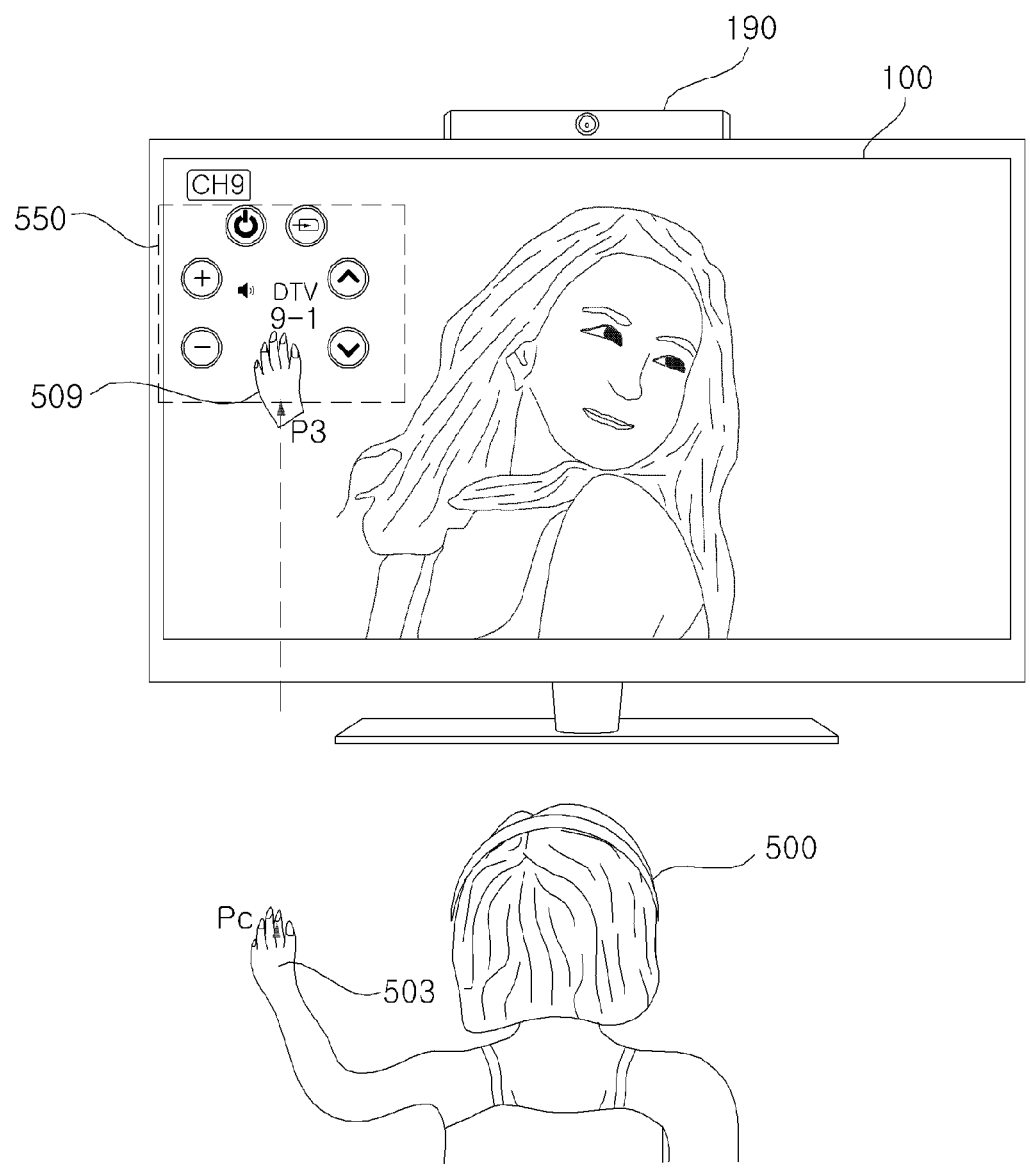

Then, as shown in FIG. 12B, the user lowers the right hand and then immediately makes the first gesture by raising the left hand 503 to a position Pc. The controller 170 recognizes the first gesture made with the left hand 503 by the user. Since the left hand is at the position Pc, the controller 170 may control the movement of the menu 550 and move the displayed menu 550 from the first position P1 to the third position P3 (corresponding to the position Pc) on the display 180, taking into account the position Pc of the left hand 503. The indicator 509 in the image of a left hand can also be displayed on the display 180 at the position P3 corresponding to the position Pc. As a consequence, the user can easily and quickly switch to display a menu in a different intended area, with increased user convenience.

In addition or as a variation, upon detection of the first gesture made with the other hand by the same user, the controller 170 may control the movement of a menu other than the displayed menu in correspondence with the position of the other hand. This example is shown in FIG. 12C.

Figure 12C:
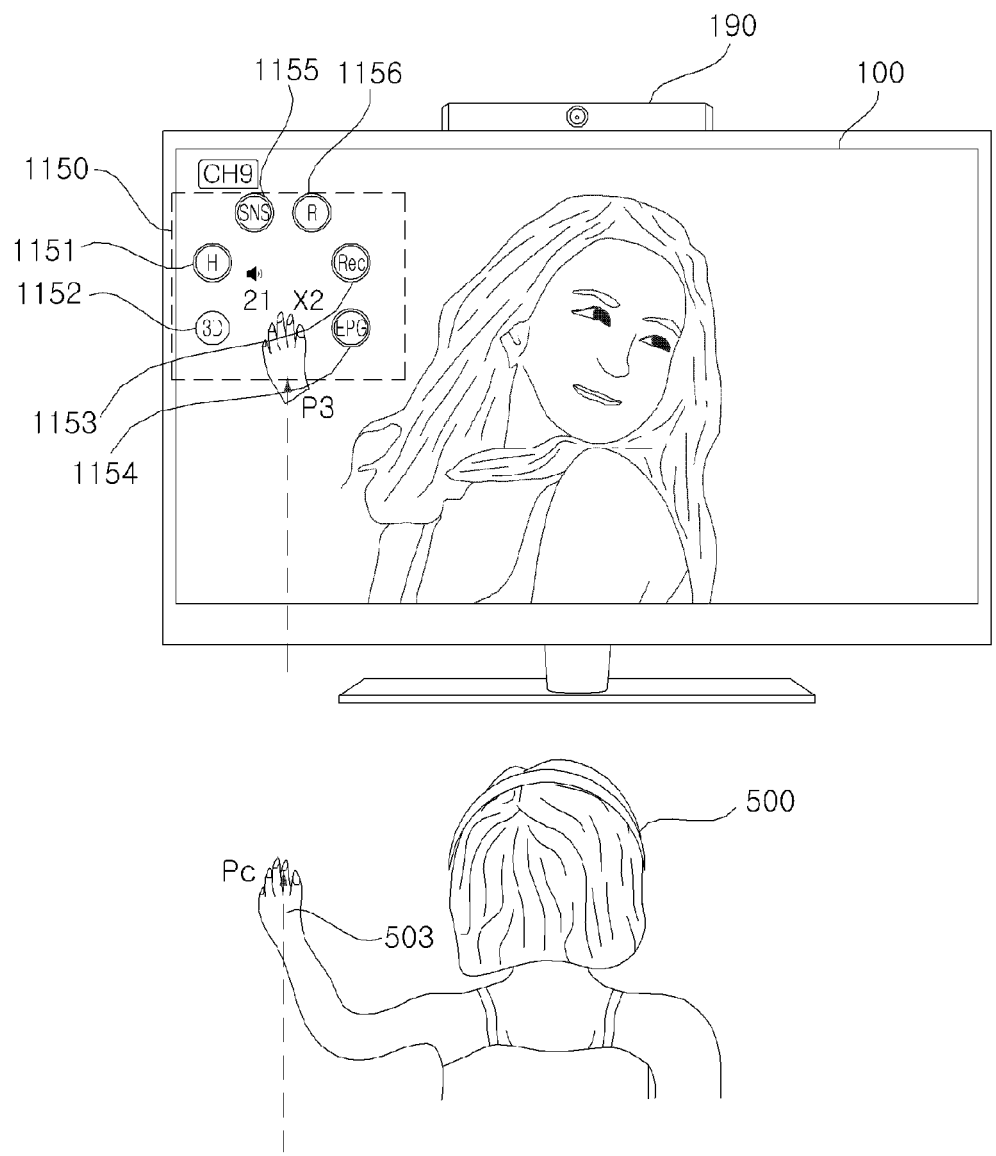

FIG. 12C is another exemplary view illustrating that when the user lowers the right hand and then immediately makes the first gesture by raising the left hand, a different menu at a different location is displayed on the display 180.

As shown in FIG. 12C, the controller 170 recognizes the first gesture made with the left hand 503 by the user. If the left hand is at the position Pc, the controller 170 may display the third menu (1150) and control the movement of the third menu 1150 to the third position P3, taking into account the position Pc of the left hand. That is, from the situation of FIG. 12A, if the user lowers the right hand and then raises the left hand 503 to the position Pc, the controller 170 removes the displayed first menu 550 while displaying the third menu 1150 at the position P3 corresponding to the position Pc as shown in FIG. 12C.

As described before, the third menu 1150 may include the home item 1151, the 3D item 1152, the recording item 1153, the broadcasting information item 1154, the social network item 1155, and the recommend item 1156. The items of the third menu 1150 may be modified in various manners other than those illustrated in FIG. 12C.

Meanwhile, upon detection of a first gesture made by another user with the menu displayed in response to the first gesture of the user, the controller 170 may control continuous displaying of the menu irrespective of the first gesture of another user. That is, the controller 170 may grant the right to control to the user that has made a gesture first. This will be described in more detail referring to FIGS. 13A-13B.

Figure 13A:
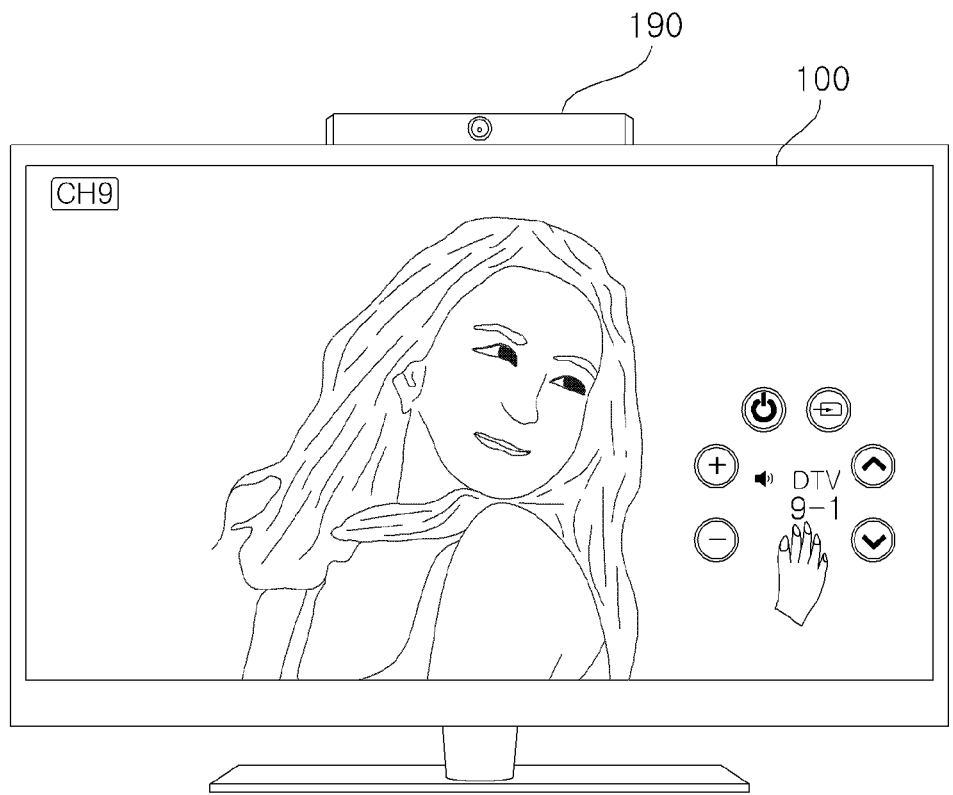
Figure 13A:
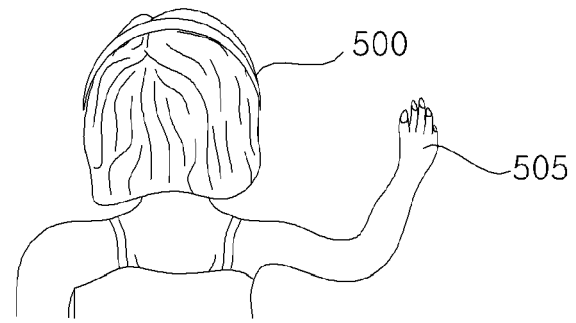

FIG. 13A is an exemplary view illustrating that the menu 550 including a plurality of items is displayed at the first position P1 corresponding to the position Pa of the right hand 505 of the first user 500 in response to the first gesture that the first user 500 has made by raising the right hand 505 to the position Pa during viewing of the broadcast image 510 on the display 180.

Figure 13B:
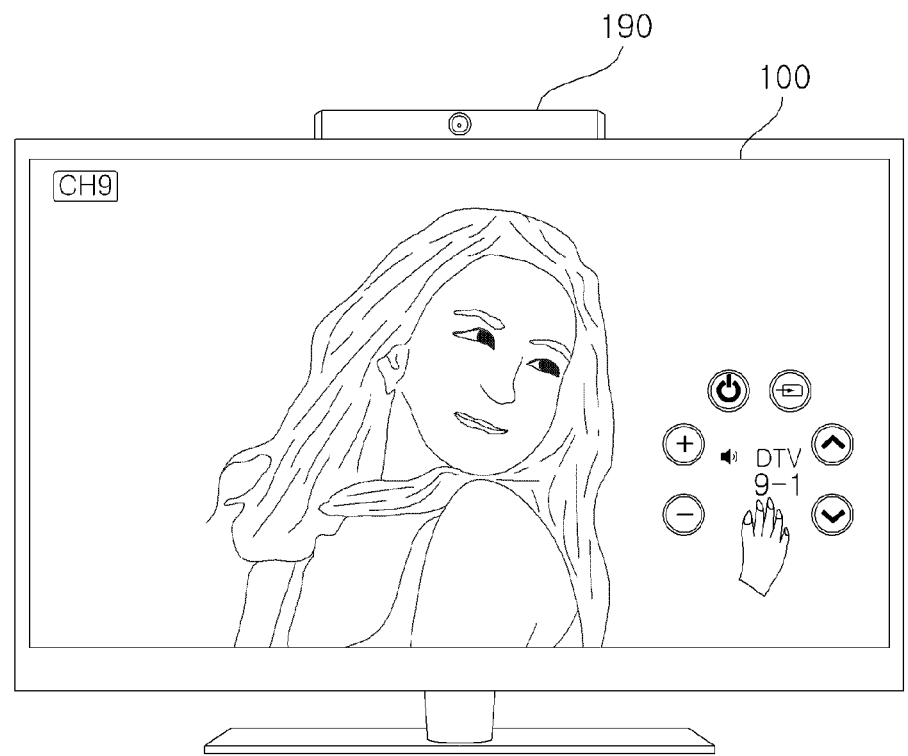
Figure 13B:
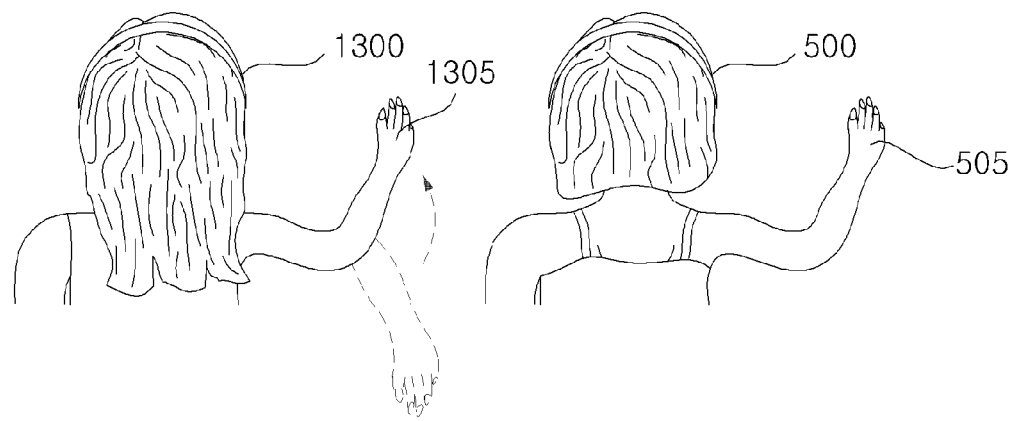

Then, as shown in FIG. 13B, a second user 1300 is making the first gesture by raising his or her right hand 1305, independently of the first user 500.

In the example of FIG. 13B, because the first user 500 is the user that has made the first gesture first and thus triggered the displaying of the menu 550, the image display apparatus 100 may keep displaying the menu 550 at the same position, in spite of the gesture of the second user 1300. In another example, the controller 170 may recognize the gesture of the second user 1300 and may carry out a menu displaying operation according to the recognized gesture of the second user 1300.

Meanwhile, the controller 170 may control changing of at least one of the size, brightness, or color of a menu being displayed on the display 180 in response to a user's gesture, according to the distance between the image display apparatus 100 and the user. This will be described in more detail referring to FIGS. 14A-14D which illustrate an example of changing the size. However, the size, brightness, and/or color of the menu may be changed according to the present invention.

Figure 14A:
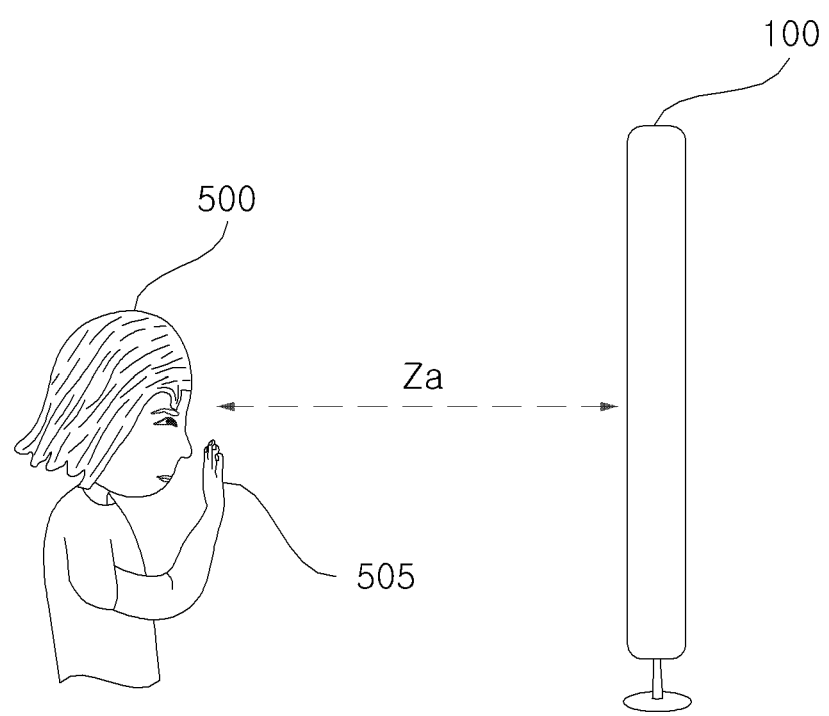
Figure 14B:
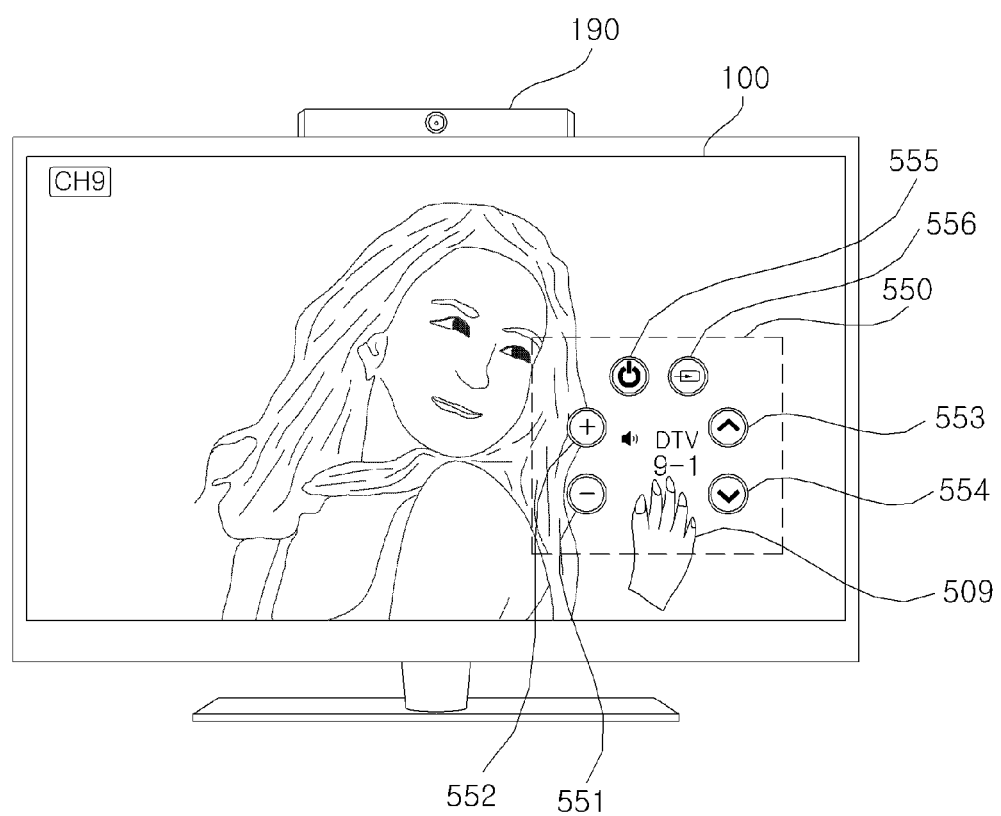
Figure 14C:
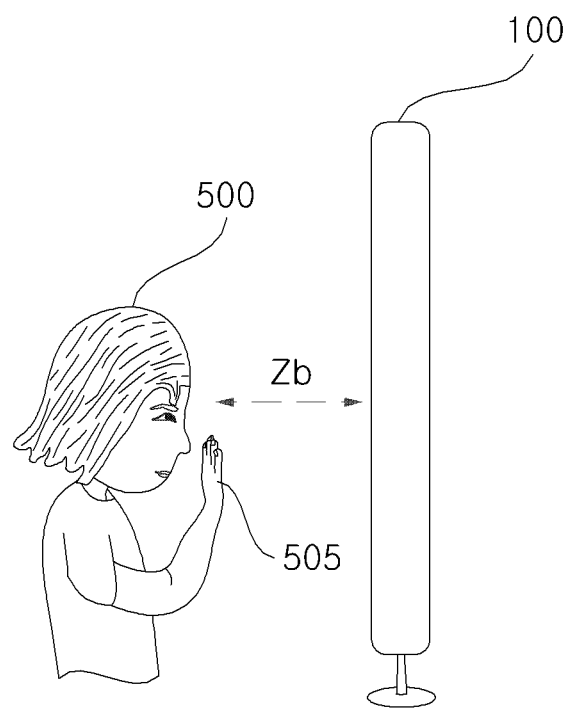

FIG. 14A is an exemplary view illustrating a first distance Za between the user 500 and the image display apparatus 100 and FIG. 14C is an exemplary view illustrating a second distance Zb between the user 500 and the image display apparatus 100. The second distance Zb is smaller than the first distance Za.

As shown in FIG. 14A, if the user 500 makes the first gesture by raising the right hand, which is positioned at the first distance Za apart from the image display apparatus 100, the controller 170 controls displaying of the first menu 550 in a first size as shown in FIG. 14B.

Figure 14D:
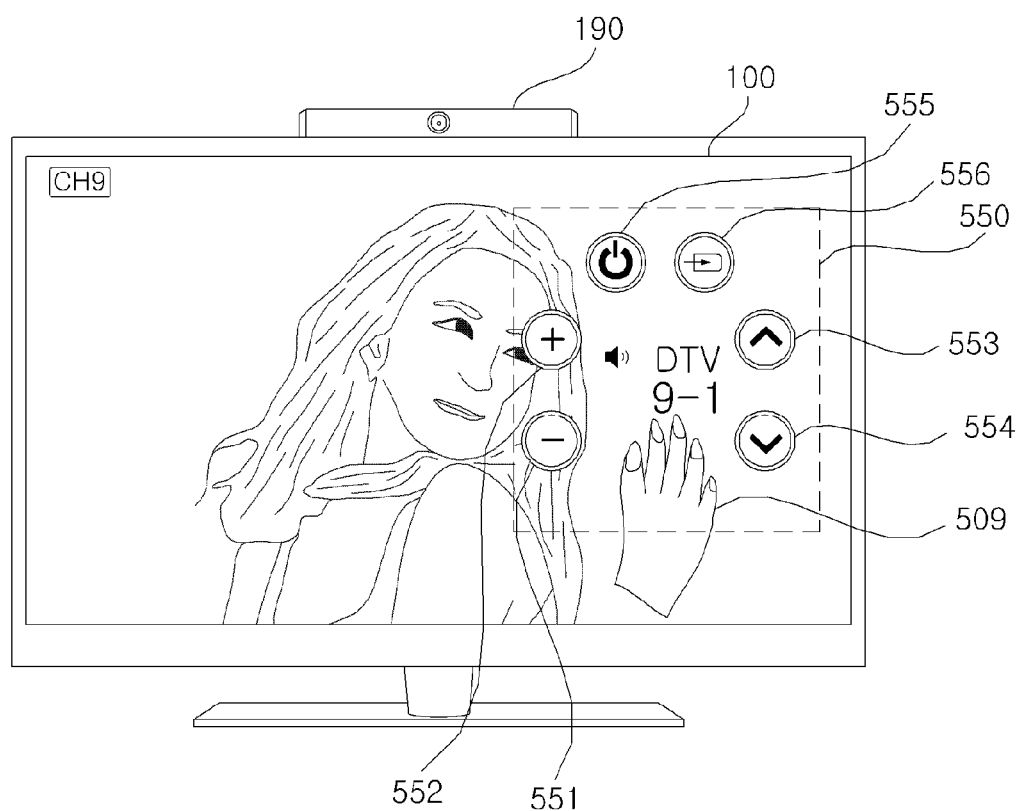

On the other hand, as shown in FIG. 14C, if the user 500 makes the first gesture by raising the right hand, which is positioned at the second distance Zb apart from the image display apparatus 100, the controller 170 controls displaying of the same first menu 550 but in a second size which is larger than the first size of the first menu 550 as shown in FIG. 14D. As such, the items of the first menu in the second size are displayed larger on the display 180 than the items of the first menu in the first size. The pointer 509 indicating the position of the user's hand may also be enlarged as shown in FIG. 14D.

That is, as the user 500 is positioned nearer to the image display apparatus 100, a larger menu may be displayed in response to the user's gesture. Therefore, the user 500 can readily perceive the distance to the image display apparatus 100. Further, by moving the hand from a specific gesture position towards or away from the image display apparatus 100, the size of the menu being displayed on the display 180 according to the gesture can be changed. As such, the user can select the size of the menu being displayed to be suitable for the user's viewing preference.

Meanwhile, as a variation, as the user 500 is positioned farther from the image display apparatus 100, a larger menu may be displayed in response to the user's gesture in order to prevent the menu from being less clear due to the increased distance.

According to an embodiment, the controller 170 may control displaying of a menu at a position corresponding to the position of the user's hand at an image area experiencing a less change, according to the user's first gesture. This will be described in more detail referring to FIGS. 15A-15D.

Figure 15A:
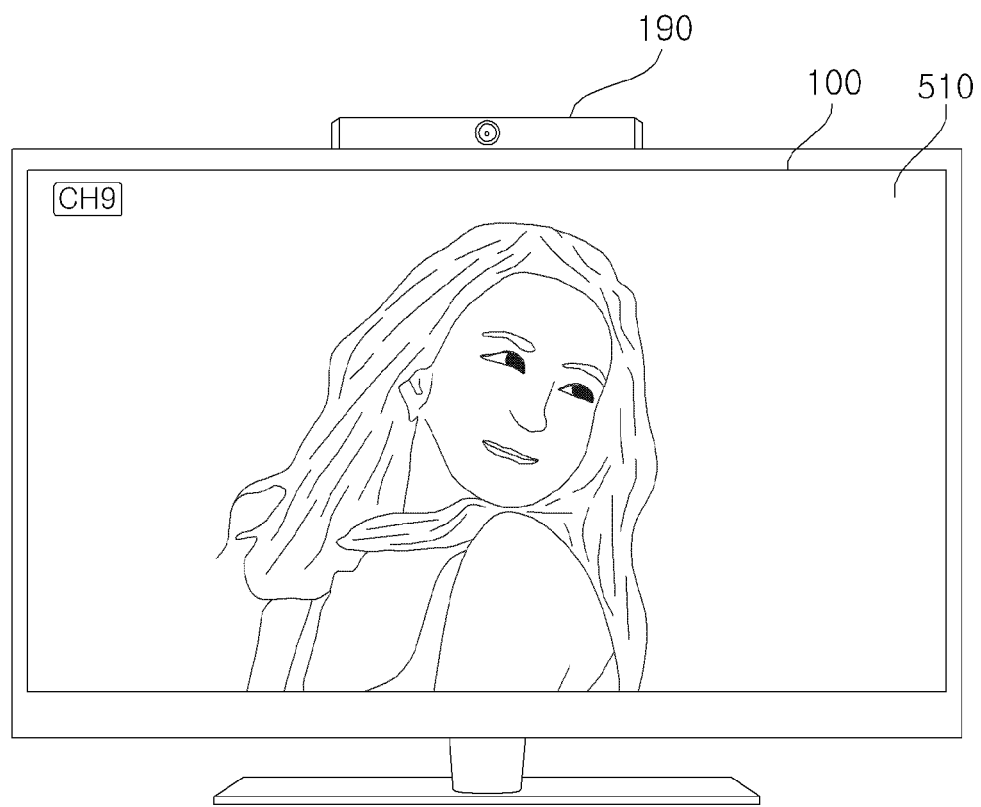
Figure 15A:
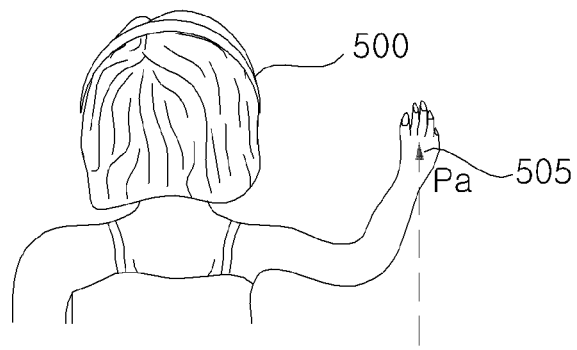

FIG. 15A is an exemplary view illustrating that the user 500 is making the first gesture with the right hand 505 at the position Pa in relation to the image display apparatus 100. If the displayed broadcast image 510 is or will be overlapped partially with a menu to be displayed (e.g., at the position P1) in response to the first gesture, the controller 170 may determine a different position at which the menu will be displayed, taking into account a less changing area in the broadcast image 510 and the position of the user's hand based on the motion vectors of each frame, so that the user can view the broadcast image 510 as well as the menu without interruptions. In one example, the controller 170 automatically moves the menu and displays the menu at an appropriate location on the screen when the menu to be displayed overlaps the image (e.g., person being displayed in the movie). This can be done using the existing techniques such Auto content recognition (ACR) or analyzing the difference between the brightness among the pixel values, etc.

Figure 15B:
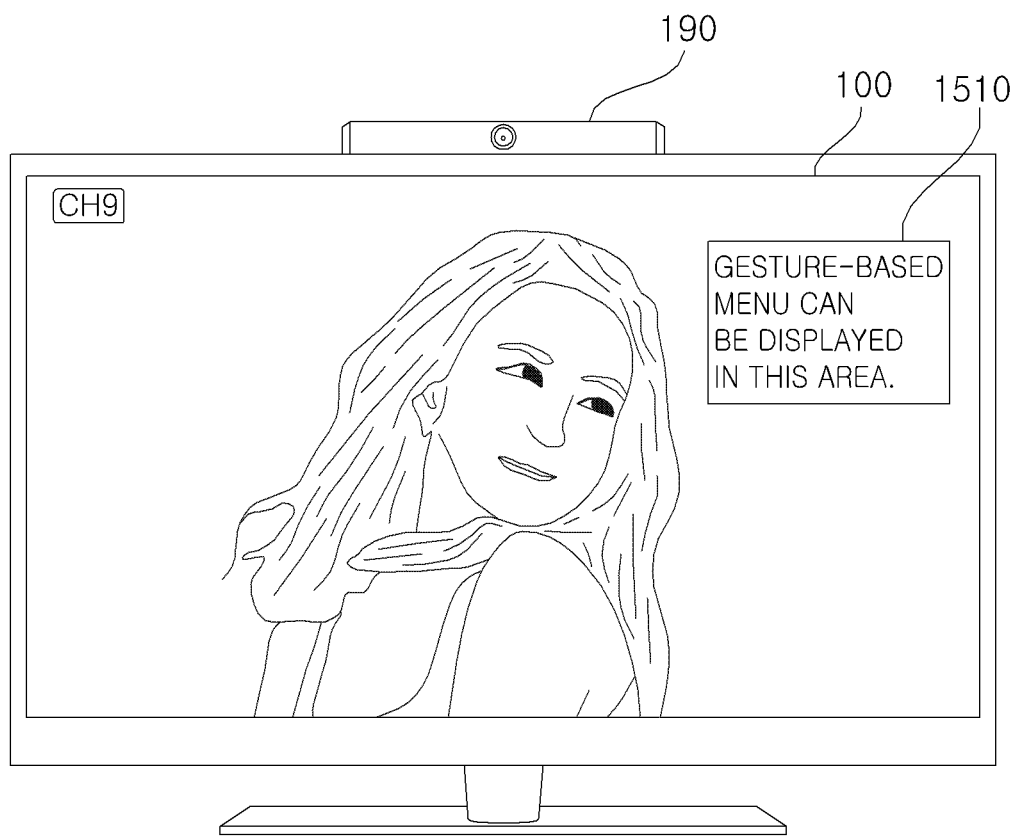

In this regard, if the menu is expected to be displayed over an object within the broadcast image or in an area experiencing a large change, the controller 170 may control displaying of an object or sign prompting the user to move the hand, an example of which being illustrated in FIG. 15B.

FIG. 15B is an exemplary view illustrating an object 1510 prompting the user to move the hand. The object 1510 can indicate a new location of the menu to be displayed, which will not interfere with the broadcast image 510 being displayed on the display 180. Upon viewing the object 1510, the user can move the right hand from the position Pa to a different position (e.g., Pd in FIG. 15C) if the user desires to display the menu at the new position.

Figure 15C:
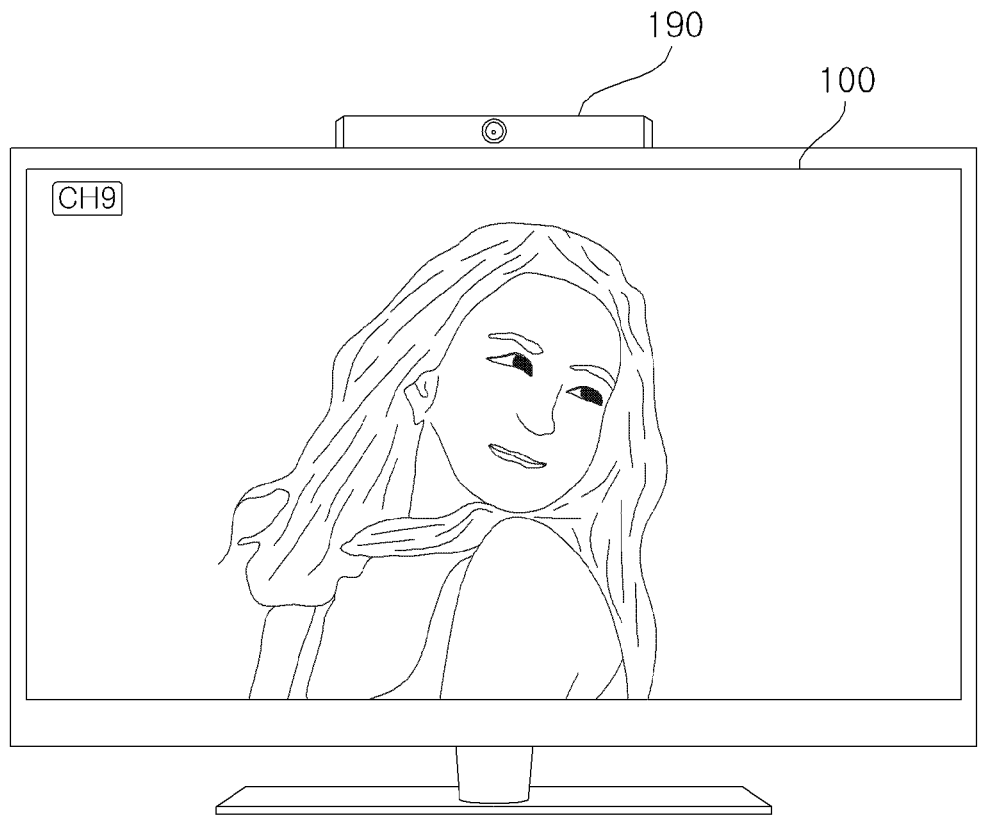
Figure 15C:
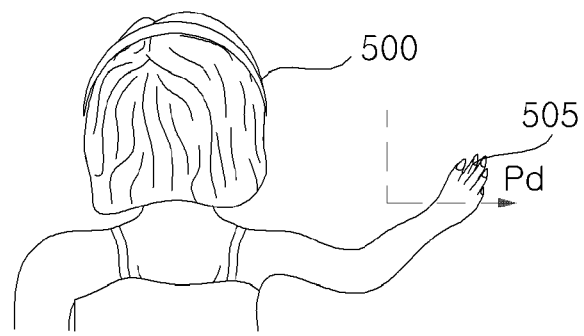
Figure 15D:
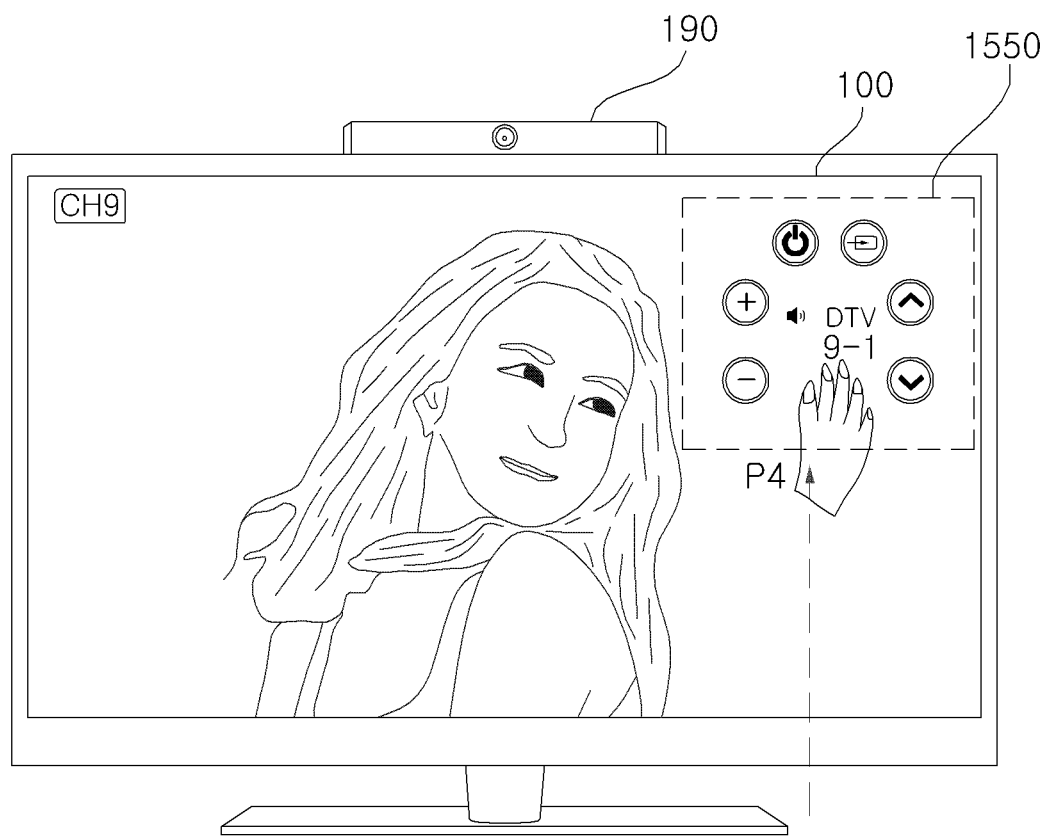

If the user makes the first gesture with the right hand at the position Pd as illustrated in FIG. 15C, a menu 1550 may be displayed in a less changing area of the broadcast image 510, that is, at a fourth position P4 as illustrated in FIG. 15D. A less changing area of the broadcast image 510 can mean a screen area in which the broadcast image being displayed at that screen area changes less compared to other screen areas of the display 180. Therefore, the user can view an intended menu without interruptions to the on-going broadcast image.

Furthermore, even though the user is viewing the TV 100 while lying down, a menu can be displayed in response to a gesture in the same manner according to the embodiment of the present invention. This will be described in more detail referring to FIGS. 16A-16C.

Figure 16A:
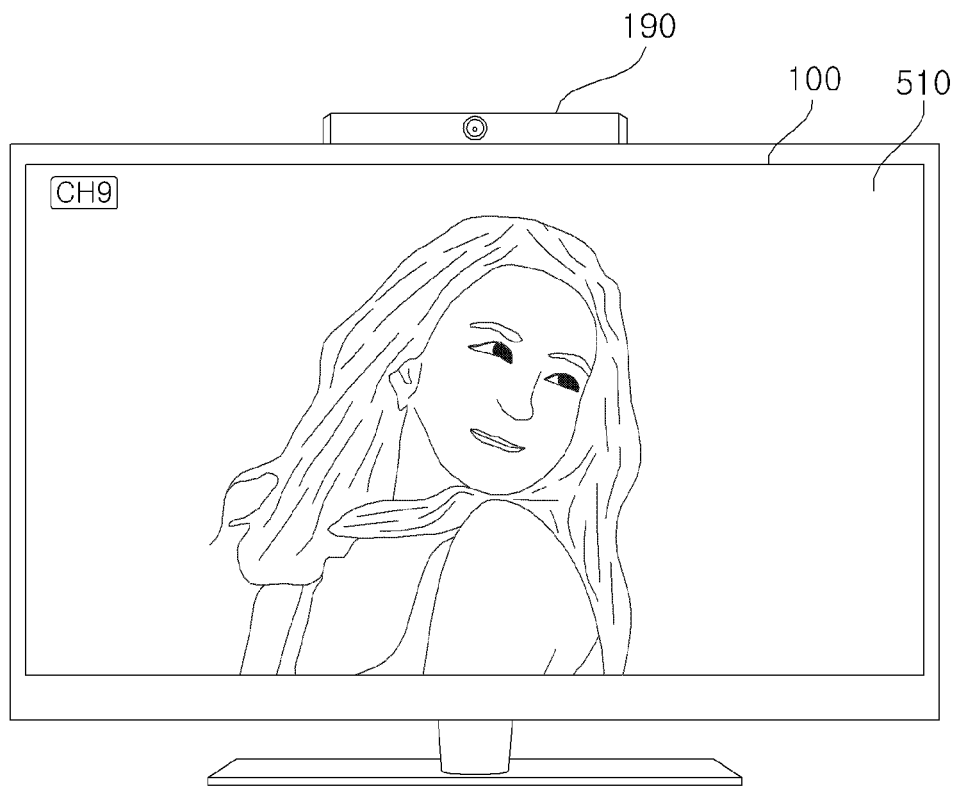
Figure 16A:
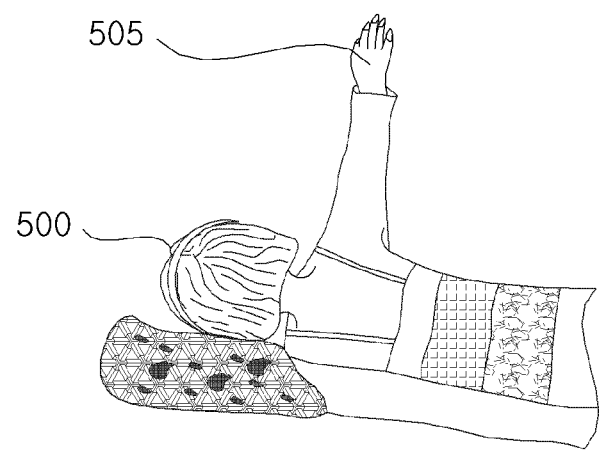

FIG. 16A is an exemplary view illustrating that the user 500 makes the first gesture by raising the right hand 505 at the position Pa as described above, while viewing the broadcast image 510 through the image display apparatus 100.

The camera 190 captures an image including the user's face and hand and provides the captured image to the controller 170.

Figure 16B:
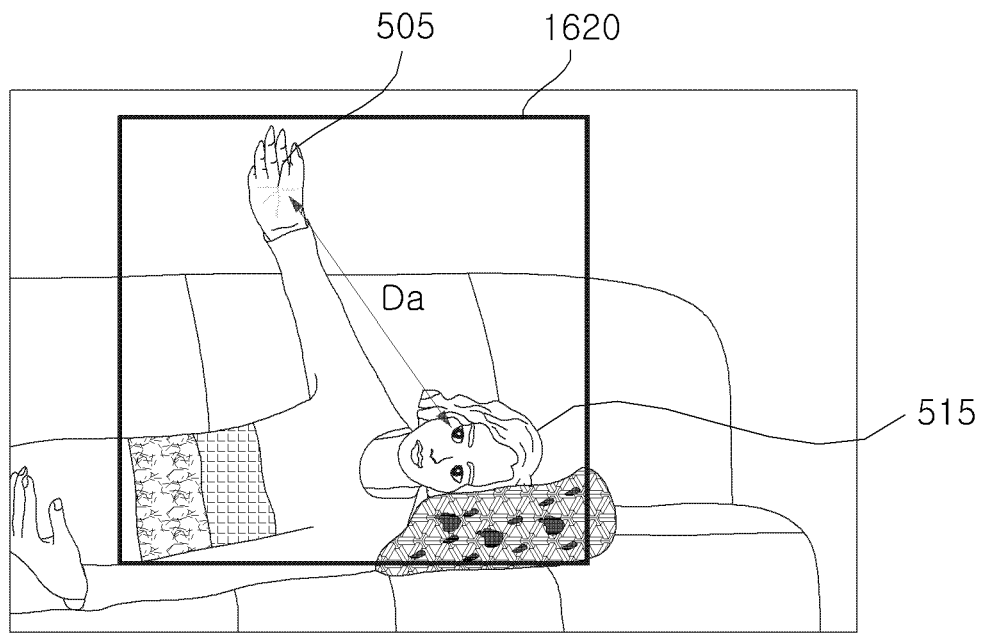

As shown in FIG. 16B, from the captured image, the controller 170 may measure a distance Da between the user's face 515 and the user's right hand 505 and compare the distance Da with the reference distance Dref or any other predefined reference distance.

Figure 16C:
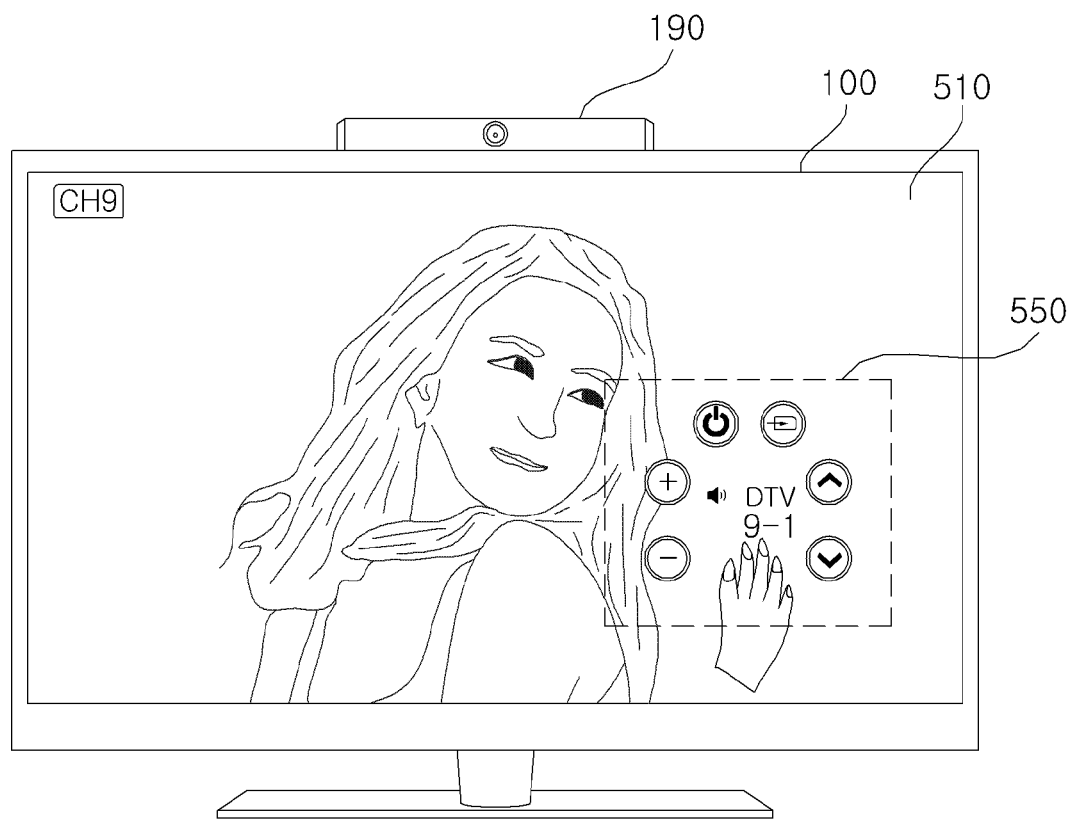
Figure 16C:
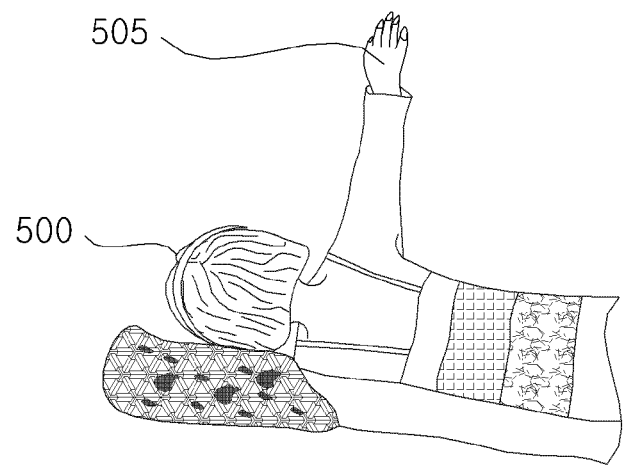

Accordingly, the menu 550 including a plurality of items may be displayed at the first position P1 corresponding to the position Pa of the right hand of the user 500, along with the displayed broadcast image 510, as illustrated in FIG. 16C. Since a menu is displayed in a user-intended area on the display in correspondence with the position of the user's hand, user convenience can be increased.

Even when the image display apparatus 100 is powered off, the user may make the first gesture with a hand. For example, when the user raises the right hand, thus making the first gesture regarding the powered-off image display apparatus 100, the camera 190 and the controller 170 in a waiting state operates although an image is not displayed on the display 180 due to the power-off state of the apparatus 100.

That is, the camera 190 captures the user's face and hand and provides the captured image to the controller 170. The controller 170 measures the distance between the user's face and the user's right hand. If the distance is equal to or smaller than the reference distance Dref, the controller 170 may recognize the gesture as the predefined first gesture.

Then, the controller 170 may control the power-on of the image display apparatus 100 based on the first gesture. For instance, the controller 170 may fully turn on the image display apparatus 100 in response to the detected gesture. Further, the controller 170 may control displaying of a specific image on the display 180. Therefore, user convenience can be increased.

Furthermore, according to an example of the present invention, the user can raise two hands at the same time to cause multiple menus to be displayed on the screen. In that case, each hand can correspond to a different menu so that two or more different menus respectively corresponding to the hands may be displayed at positions respectively corresponding to the positions of the hands.

As is apparent from the above description, since the image display apparatus recognizes a first gesture made with a hand by a user and displays a menu at a position corresponding to the position of the user's hand on the display in response to the first gesture, the image display apparatus can display the menu in a user-intended area. Thus, user convenience can be increased.

Further the menu displayed by the user's gesture can be moved according to the movement of the hand or other gesture, thereby further increasing user convenience.

If the user makes a gesture with the other hand, the displayed menu may be changed. Therefore, a user-intended menu can be easily displayed.

When a second user makes a hand gesture, while a menu is being displayed in response to a previous hand gesture of a first user, priority is given to the first user and thus the displayed menu is kept displayed in its original state on the display. Therefore, a gesture-incurred malfunction can be prevented.

When the user makes a finger gesture in regard to a menu displayed on the display, a menu item corresponding to the finger can be focused in the menu. Therefore, the user can focus on an intended item easily.

If the user makes a grip gesture while the specific item is being focused, the item is easily selected and/or executed.

The image display apparatus and the method for operating the image display apparatus according to the foregoing exemplary embodiments are not restricted to the exemplary embodiments set forth herein. Therefore, variations and combinations of the exemplary embodiments set forth herein may fall within the scope of the present invention.

The method for operating the image display apparatus according to the foregoing exemplary embodiments may be implemented as code that can be written on a computer-readable recording medium and thus read by a processor in the portable terminal and/or the image display apparatus. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an image display apparatus including a display, the method comprising:
   displaying a broadcast image on a screen of the display;
   recognizing, by a camera unit of the image display apparatus, a specific gesture made with a user's hand as a first gesture; and
   displaying, on a screen of the display, the broadcast image and a menu at a position of the screen corresponding to the position of the user's hand according to the recognized first gesture,
   wherein a position of the menu is varied according to the position of the user's hand,
   wherein when the menu at a first position of the screen corresponding to a first position of the user's hand according to the recognized first gesture is expected to be overlapped with the broadcast image, an object indicating a second position for the menu to be displayed and prompting the user to move their hand to the second position is displayed on the screen, and
   wherein when the menu is displayed at the second position of the screen corresponding to a moved position of the user's hand according to the recognized first gesture, the broadcast image and the menu at the second position are displayed.

2. The method according to claim 1, further comprising:
obtaining, by a camera unit of the image display apparatus, an image of the user,
wherein the recognizing step recognizes the first gesture when the obtained image includes the user's hand and the user's face, and
wherein the displaying step displays the menu at the position of the screen corresponding to the position of the user's hand in the obtained image.

3. The method according to claim 1, further comprising:
when the user's hand moves to a new position after the first gesture is recognized, moving the entire menu or at least one of a plurality of items in the menu, to a new position on the screen,
the new position on the screen corresponding to the new position of the user's hand.

4. The method according to claim 1, further comprising displaying contents on the screen,
wherein while the contents are being displayed on the screen, the step of displaying the menu displays the menu at an area of the screen where images of the contents being displayed change the least or less than a certain level or where an object being displayed in the contents is not present.

5. The method according to claim 1, further comprising displaying contents on the screen,
wherein the displaying the menu comprises displaying a different menu according to a property of the displayed contents.

6. The method according to claim 1, wherein the menu includes a plurality of items, and
wherein the method further comprises:
designating the plurality of items to correspond to different fingers of the user's hand.

7. The method according to claim 1, further comprising:
focusing on, by the image display apparatus, one of a plurality of items in the displayed menu according to a finger gesture of the user.

8. The method according to claim 7, further comprising:
when a grip gesture by the user is received while the one item is focused on, selecting the one focused item in response to the grip gesture, and executing a function associated with the selected item.

9. The method according to claim 1, further comprising:
changing at least one of a size, brightness, and color of the displayed menu on the display according to a distance between the user's hand and the image display apparatus.

10. The method according to claim 1, further comprising:
when the user makes a rotation gesture by rotating the user's hand while the menu is displayed on the display, displaying another menu different from the displayed menu.

11. The method according to claim 1, further comprising:
upon a successive selection of a specific item in the displayed menu, displaying on the display a scroll bar associated with the specific item for advancing to a desired object using a gesture made by the user's hand.

12. The method according to claim 1, further comprising:
when the user makes a specific gesture with the other hand, recognizing the specific gesture made with the other hand as a second gesture; and
displaying, on the display, another menu different from the displayed menu based on the second gestured made with the other hand.

13. The method according to claim 1, further comprising:
when the user makes a specific gesture with the other hand, recognizing the specific gesture made with the other hand as a second gesture; and
moving the displayed menu on the display to a new position corresponding to a position of the other hand based on the second gesture made with the other hand.

14. The method according to claim 1, further comprising:
when a different user makes a specific gesture with the different user's hand while the menu is displayed on the screen, recognizing the specific gesture made with the different user's hand as a second gesture,
wherein the displayed menu is maintained at the same position on the screen irrespective of the recognized second gesture.

15. An image display apparatus comprising:
a broadcast receiver to receive a broadcast signal;
a display including a screen; and
a controller configured to:
display a broadcast image based on the received broadcast signal on a screen of the display,
recognize, by a camera unit of the image display apparatus, a specific gesture made with a user's hand as a first gesture, and
display, on the screen of the display, the broadcast image and a menu at a position of the screen corresponding to the position of the user's hand according to the recognized first gesture,
wherein a position of the menu is varied according to the position of the user's hand,
wherein when the menu at a first position of the screen corresponding to a first position of the user's hand according to the recognized first gesture is expected to be overlapped with the broadcast image, an object indicating a second position for the menu to be displayed and prompting the user to move their hand to the second position is displayed on the screen, and wherein when the menu is displayed at the second position of the screen corresponding to a moved position of the user's hand according to the recognized first gesture, the broadcast image and the menu at the second position are displayed.

16. The image display apparatus according to claim 15, further comprising:
a camera unit configured to obtain an image of the user,
wherein the controller recognizes the first gesture when the obtained image includes the user's hand and the user's face, and
wherein the controller displays the menu at the position of the screen corresponding to the position of the user's hand in the obtained image.

17. The image display apparatus according to claim 15, wherein when the controller displays contents on the screen, the displaying the menu at the position of the screen corresponding to the position of the user's hand according to the recognized first gesture includes displaying a different menu according to a property of the displayed contents.

18. The image display apparatus according to claim 15, wherein the menu includes a plurality of items, and
wherein the controller is further configured to designate the plurality of items to correspond to different fingers of the user's hand.

19. The image display apparatus according to claim 15, wherein the controller is further configured to change at least one of a size, brightness, and color of the displayed menu on the display according to a distance between the user's hand and the image display apparatus.

* * * * *